(12) United States Patent
Kim et al.

(10) Patent No.: US 11,726,670 B2
(45) Date of Patent: Aug. 15, 2023

(54) METHODS OF OPERATING MEMORY CONTROLLERS, MEMORY CONTROLLERS PERFORMING THE METHODS AND MEMORY SYSTEMS INCLUDING THE MEMORY CONTROLLERS

(71) Applicant: Samsung Electronics Co., Ltd., Suwon-si (KR)

(72) Inventors: Sungrae Kim, Seoul (KR); Sunghye Cho, Hwaseong-si (KR); Kijun Lee, Seoul (KR); Myungkyu Lee, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 17/704,354

(22) Filed: Mar. 25, 2022

(65) Prior Publication Data
US 2023/0004308 A1     Jan. 5, 2023

(30) Foreign Application Priority Data
Jun. 30, 2021   (KR) .................. 10-2021-0085267

(51) Int. Cl.
*G06F 3/06*      (2006.01)
(52) U.S. Cl.
CPC .......... *G06F 3/0619* (2013.01); *G06F 3/0655* (2013.01); *G06F 3/0673* (2013.01)
(58) Field of Classification Search
CPC .... G06F 3/0619; G06F 3/0655; G06F 3/0673; G06F 3/065; G06F 3/0688;
(Continued)

(56) References Cited

U.S. PATENT DOCUMENTS 8,171,377 B2   5/2012 Dell et al.
9,170,876 B1  10/2015 Bates et al.
(Continued)

FOREIGN PATENT DOCUMENTS

KR      102143517 B1    8/2020
KR      102191223 B1   12/2020

OTHER PUBLICATIONS

Chen et al. "Using Low Cost Erasure and Error Correction Schemes to Improve Reliability of Commodity DRAM Systems" IEEE Transactions on Computers 65(12):3766-3779 (Dec. 2016).

*Primary Examiner* — Jason W Blust
(74) *Attorney, Agent, or Firm* — Myers Bigel, P.A.

(57) ABSTRACT

In a method of operating a memory controller, a decoding status flag is received from a memory module including a plurality of data chips and at least one parity chip. Each of the plurality of data chips and the at least one parity chip may include an on-die error correction code (ECC) engine. The decoding status flag is generated by the on-die ECC engines. A first number and a second number may be obtained based on the decoding status flag. The first number represents a number of first chips including an uncorrectable error that is uncorrectable by the on-die ECC engine. The second number represents a number of second chips including a correctable error that is correctable by the on-die ECC engine. At least one of a plurality of decoding schemes is selected based on at least one of the first number and the second number. A system ECC engine may perform ECC decoding on at least one of the first chips and the second chips based on the selected decoding scheme.

20 Claims, 38 Drawing Sheets

(58) Field of Classification Search
CPC ............ G06F 11/1044; G06F 11/0772; G06F 11/1032; G06F 11/1048; H03M 13/1105; H03M 13/1575
See application file for complete search history.

(56) References Cited

U.S. PATENT DOCUMENTS

| | | |
|---|---|---|
| 9,632,856 B2 | 4/2017 | Chung et al. |
| 9,680,509 B2 | 6/2017 | Kwok |
| 9,691,505 B2 | 6/2017 | Das et al. |
| 10,268,541 B2 | 4/2019 | Niu et al. |
| 10,467,091 B2 | 11/2019 | Park et al. |
| 10,684,793 B2 | 6/2020 | Chung et al. |
| 10,901,839 B2 | 1/2021 | O'Connor et al. |
| 10,977,118 B2 | 4/2021 | Niu et al. |
| 11,010,242 B2 | 5/2021 | Niu et al. |
| 2007/0047344 A1* | 3/2007 | Thayer ................. G06F 11/1044 365/201 |
| 2018/0358989 A1* | 12/2018 | Mehra ................. H03M 13/2918 |
| 2019/0340067 A1* | 11/2019 | Kim ..................... G06F 11/1048 |
| 2019/0347159 A1* | 11/2019 | Chang ................... G11C 11/409 |
| 2020/0241957 A1* | 7/2020 | Lien .................... G06F 11/1032 |
| 2021/0083687 A1 | 3/2021 | Lee et al. |

\* cited by examiner

FIG. 6B
OSMb

```
0 0 0 0 0 0 0 0 0 0 0 0 0 1
1 0 0 0 0 0 0 0 0 0 0 0 0 1
0 1 0 0 0 0 0 0 0 0 0 0 0 0
0 0 1 0 0 0 0 0 0 0 0 0 0 1
0 0 0 1 0 0 0 0 0 0 0 0 0 0
0 0 0 0 1 0 0 0 0 0 0 0 0 0
0 0 0 0 0 1 0 0 0 0 0 0 0 0
0 0 0 0 0 0 1 0 0 0 0 0 0 0
0 0 0 0 0 0 0 1 0 0 0 0 0 0
0 0 0 0 0 0 0 0 1 0 0 0 0 0
0 0 0 0 0 0 0 0 0 1 0 0 0 0
0 0 0 0 0 0 0 0 0 0 1 0 0 0
0 0 0 0 0 0 0 0 0 0 0 1 0 0 1
0 0 0 0 0 0 0 0 0 0 0 0 1 0 0
0 0 0 0 0 0 0 0 0 0 0 0 0 1 0
0 0 0 0 0 0 0 0 0 0 0 0 0 0 1
```

FIG. 6C
ZSM

ISM

| 1 0 0 0 0 0 0 0 0 0 0 0 0 0 0 0 |
| 0 1 0 0 0 0 0 0 0 0 0 0 0 0 0 0 |
| 0 0 1 0 0 0 0 0 0 0 0 0 0 0 0 0 |
| 0 0 0 1 0 0 0 0 0 0 0 0 0 0 0 0 |
| 0 0 0 0 1 0 0 0 0 0 0 0 0 0 0 0 |
| 0 0 0 0 0 1 0 0 0 0 0 0 0 0 0 0 |
| 0 0 0 0 0 0 1 0 0 0 0 0 0 0 0 0 |
| 0 0 0 0 0 0 0 1 0 0 0 0 0 0 0 0 |
| 0 0 0 0 0 0 0 0 1 0 0 0 0 0 0 0 |
| 0 0 0 0 0 0 0 0 0 1 0 0 0 0 0 0 |
| 0 0 0 0 0 0 0 0 0 0 1 0 0 0 0 0 |
| 0 0 0 0 0 0 0 0 0 0 0 1 0 0 0 0 |
| 0 0 0 0 0 0 0 0 0 0 0 0 1 0 0 0 |
| 0 0 0 0 0 0 0 0 0 0 0 0 0 1 0 0 |
| 0 0 0 0 0 0 0 0 0 0 0 0 0 0 1 0 |
| 0 0 0 0 0 0 0 0 0 0 0 0 0 0 0 1 |

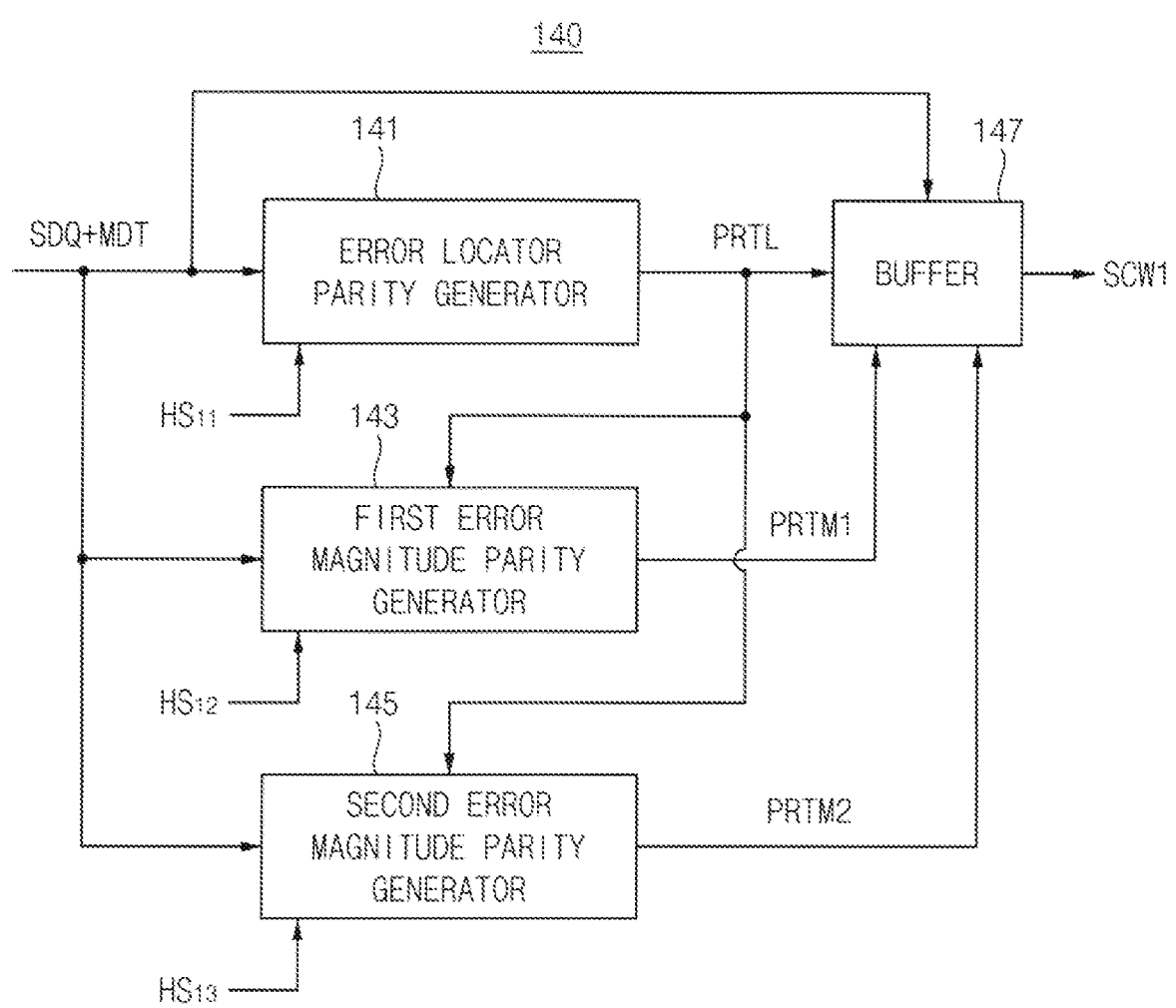

FIG. 18

|  | # OF UE | # OF CE | OPERATION |
|---|---|---|---|
| CASE11 | 0 | ≤1 | CPK_x4 |
| CASE21 | 0 | 2 | CPK_x4 (+2CED_x4) |
| CASE31 | 0 | ≥3 | CPK_x4 |
| CASE41 | 1 | - | 1CED_x4 |
| CASE51 | 2 | - | 2CED_x4 |
| CASE61 | ≥3 | - | SECC_UE |

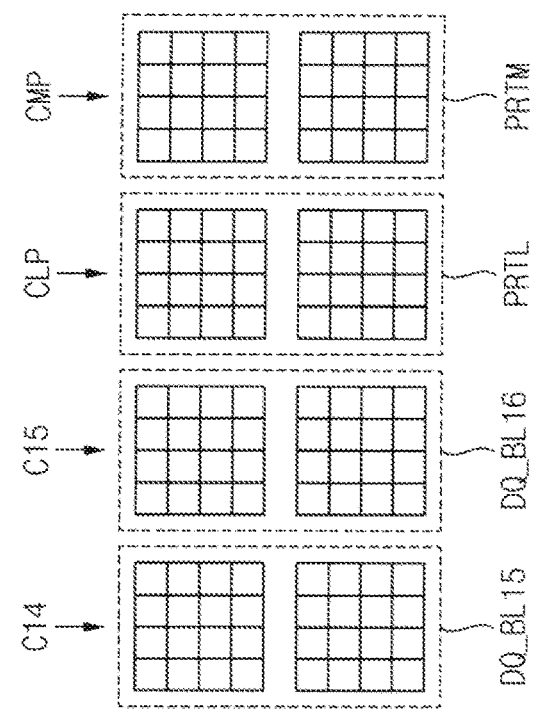
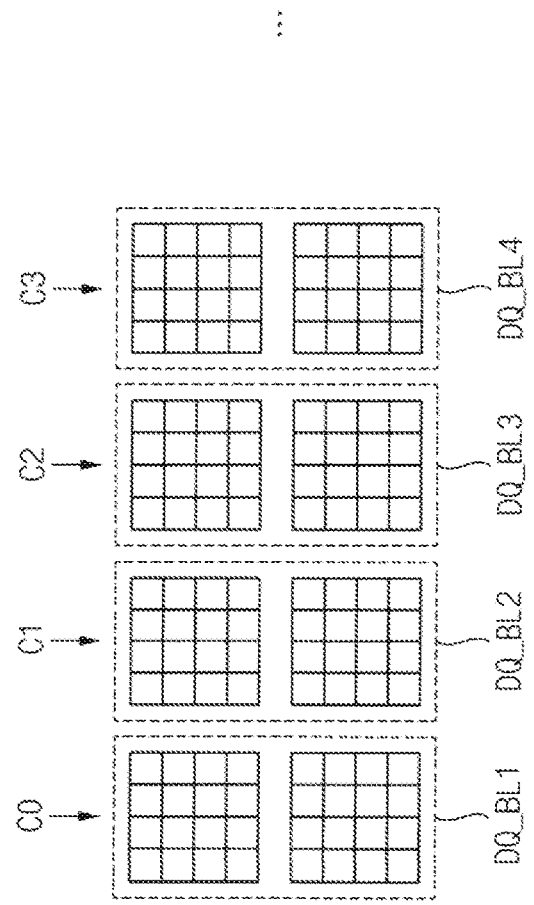
FIG. 19A

FIG. 19C
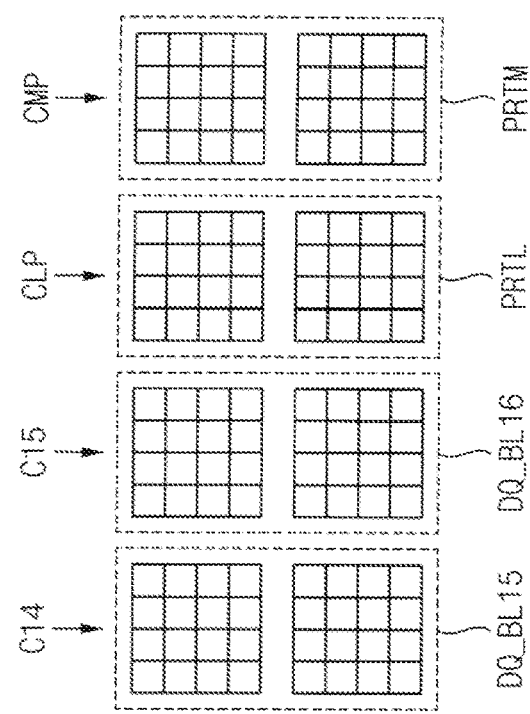
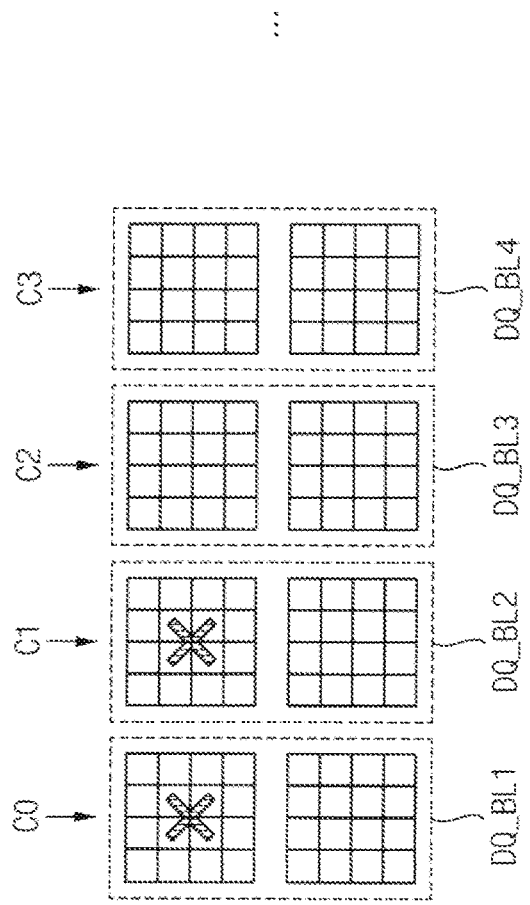

FIG. 22

|  | # OF UE | # OF CE | OPERATION |
|---|---|---|---|
| CASE12 | 0 | 0 | HCPK_x8 |
| CASE22 | 0 | 1 | HCPK_x8 (+1CED_x8) |
| CASE32 | 0 | ≥2 | HCPK_x8 |
| CASE42 | 1 | - | HCPK_x8 (+1CED_x8) |
| CASE52 | ≥2 | - | SECC_UE |

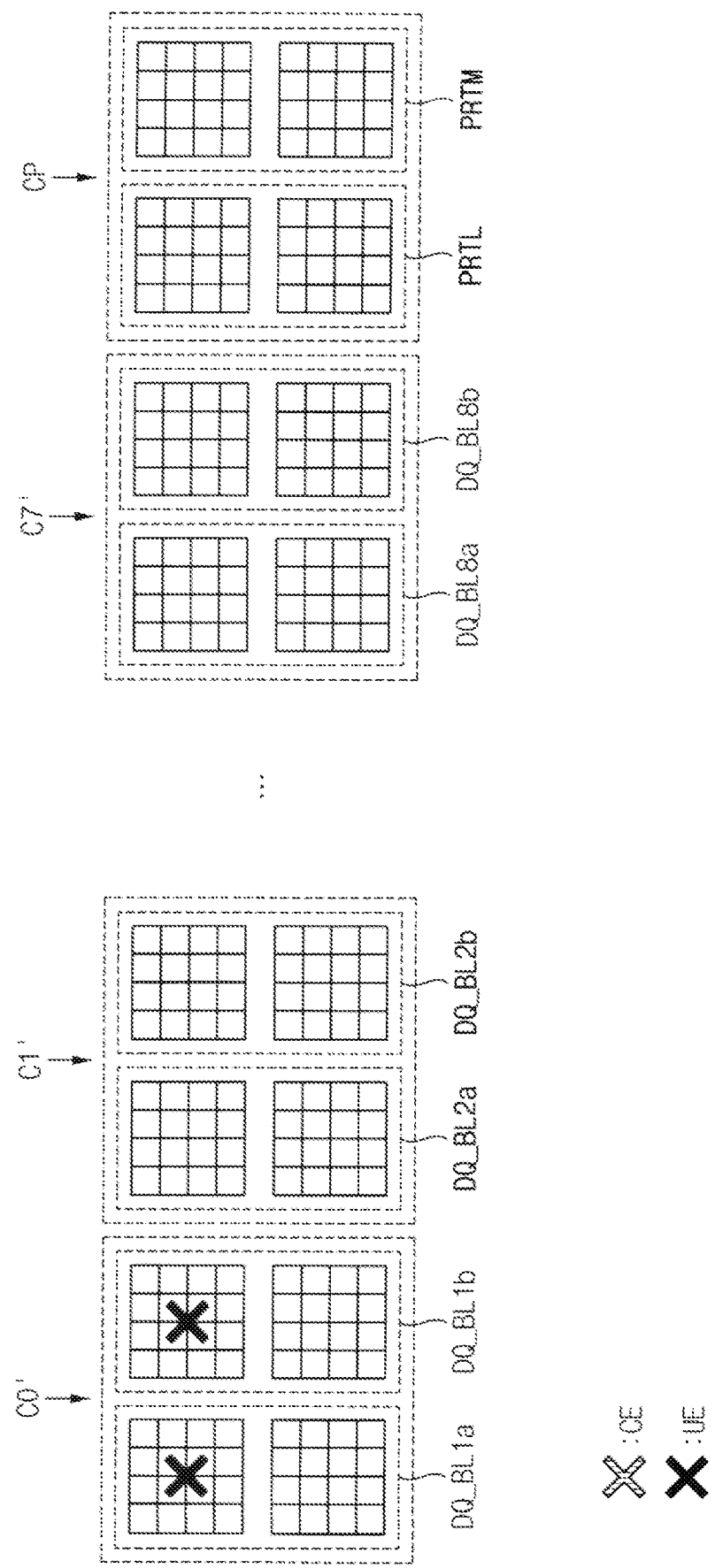

METHODS OF OPERATING MEMORY CONTROLLERS, MEMORY CONTROLLERS PERFORMING THE METHODS AND MEMORY SYSTEMS INCLUDING THE MEMORY CONTROLLERS

CROSS-REFERENCE TO RELATED APPLICATION

This application claims priority under 35 USC § 119 to Korean Patent Application No. 10-2021-0085267 filed on Jun. 30, 2021, in the Korean Intellectual Property Office (KIPO), with the contents of the above-identified application herein incorporated by reference in their entirety.

TECHNICAL FIELD

Aspects of the present disclosure relate generally to semiconductor integrated circuits, and more particularly to methods of operating memory controllers, memory controllers performing the methods, and memory systems including the memory controllers.

BACKGROUND

Semiconductor memory devices may be classified into nonvolatile memory devices, such as flash memories, and volatile memory devices, such as dynamic random access memories (DRAMs). High speed operation and cost efficiency of volatile memory devices make it possible for volatile memory devices to be used for system memories. Miniaturization and/or increased integration of memory devices is a desirable goal in semiconductor memory device manufacturing. Due to the continuing reduction in size of fabrication design rules of the volatile memory devices, bit errors in memory cells of the volatile memory devices may increase rapidly and yield of the volatile memory devices may decrease. In addition, a plurality of volatile memory devices may be provided in the form of memory modules in order to provide a relatively large storage capacity. Thus, various research projects to improve reliability of the volatile memory devices and the memory modules are ongoing.

SUMMARY

Some aspects of the present disclosure provide a method of operating a memory controller capable of efficiently performing an optimal error correction code (ECC) decoding depending on a state of a memory module.

Some aspects of the present disclosure provide a memory controller that performs the method of operating the memory controller and a memory system that includes the memory controller.

According to some aspects, in a method of operating a memory controller configured to control a memory module, a decoding status flag may be received from the memory module including a plurality of data chips and at least one parity chip. Each of the plurality of data chips and the at least one parity chip may include an on-die error correction code (ECC) engine. The decoding status flag may be generated by the on-die ECC engines. A first number and a second number may be obtained based on the decoding status flag. The first number represents a number of first chips including an uncorrectable error that is uncorrectable by the respective on-die ECC engine. The second number represents a number of second chips including a correctable error that is correctable by the respective on-die ECC engine. At least one of a plurality of decoding schemes is selected based on at least one of the first number and the second number. An ECC decoding may be performed, by a system ECC engine included in the memory controller, on at least one of the first chips and the second chips based on the selected decoding scheme.

According to some aspects, a memory controller configured to control a memory module may include a decoding status flag decoder and a system error correction code (ECC) engine. The decoding status flag decoder may receive a decoding status flag from the memory module, and obtains a first number and a second number based on the decoding status flag. The memory module may include a plurality of data chips and at least one parity chip. Each of the plurality of data chips and the at least one parity chip may include an on-die ECC engine. The decoding status flag may be generated by the on-die ECC engine. The first number represents a number of first chips including an uncorrectable error that is uncorrectable by the respective on-die ECC engine. The second number represents a number of second chips including a correctable error that is correctable by the on-die ECC engine among the plurality of data chips and the at least one parity chip. The system ECC engine may select at least one of a plurality of decoding schemes based on at least one of the first number and the second number, and may perform an ECC decoding on at least one of the first chips and the second chips based on the selected decoding scheme.

According to some aspects, a memory system includes a memory module and a memory controller. The memory module includes a plurality of data chips and at least one parity chip. Each of the plurality of data chips and the at least one parity chip includes an on-die error correction code (ECC) engine. The memory controller controls the memory module. The memory controller includes a decoding status flag decoder and a system ECC engine. The decoding status flag decoder receives a decoding status flag from the memory module, and obtains a first number and a second number based on the decoding status flag. The decoding status flag may be generated by the on-die ECC engines. The first number represents a number of first chips including an uncorrectable error that is uncorrectable by the respective on-die ECC engine. The second number represents a number of second chips including a correctable error that is correctable by the respective on-die ECC engine. The system ECC engine selects at least one of a plurality of decoding schemes based on at least one of the first number and the second number, and performs an ECC decoding on at least one of the first chips and the second chips based on the selected decoding scheme. The system ECC engine selects the at least one of the plurality of decoding schemes based on the second number in response to the first number being less than or equal to a first reference value, and selects the at least one of the plurality of decoding schemes based on the first number in response to the first number being greater than the first reference value. Each on-die ECC engine includes a syndrome generation circuit, an error locator, a data corrector and a decoding status flag generator. The syndrome generation circuit generates a syndrome based on read data and parity data. The error locator generates an error position signal by decoding the syndrome. The error position signal represents a position of an error bit in the read data. The data corrector outputs corrected data by correcting the error bit included in the read data based on the error position signal. The decoding status flag generator generates the decoding status flag based on the syndrome and the error position signal. The decoding status flag represents a state of the error bit in the read data.

In the method of operating the memory controller, the memory controller and the memory system according to example embodiments, the memory controller may receive the decoding status flag that is generated by the on-die ECC engine included in the memory chip included in the memory module, and the system ECC engine included in the memory controller may perform the ECC decoding by selecting the decoding scheme suitable for the current situation of error occurrence in the memory module based on the decoding status flag signal. Accordingly, the performance and/or efficiency of the ECC decoding may be improved or enhanced.

BRIEF DESCRIPTION OF THE DRAWINGS

Some illustrative and non-limiting examples of embodiments will be more clearly understood from the following detailed description taken in conjunction with the accompanying drawings.

FIGS. 6A, 6B, 6C and 6D are diagrams illustrating an example of a parity generation matrix used in a system ECC engine of FIG. 5.

FIG. 7 is a block diagram illustrating an example of an ECC encoder included in a system ECC engine of FIG. 5.

FIGS. 18, 19A, 19B, 19C, 19D, 19E, 19F and 19G are diagrams for describing operations of FIGS. 16 and 17.

FIGS. 22, 23A, 23B, 23C, 23D and 23E are diagrams for describing operations of FIGS. 20 and 21.

DETAILED DESCRIPTION OF THE EMBODIMENTS

Figure 1:
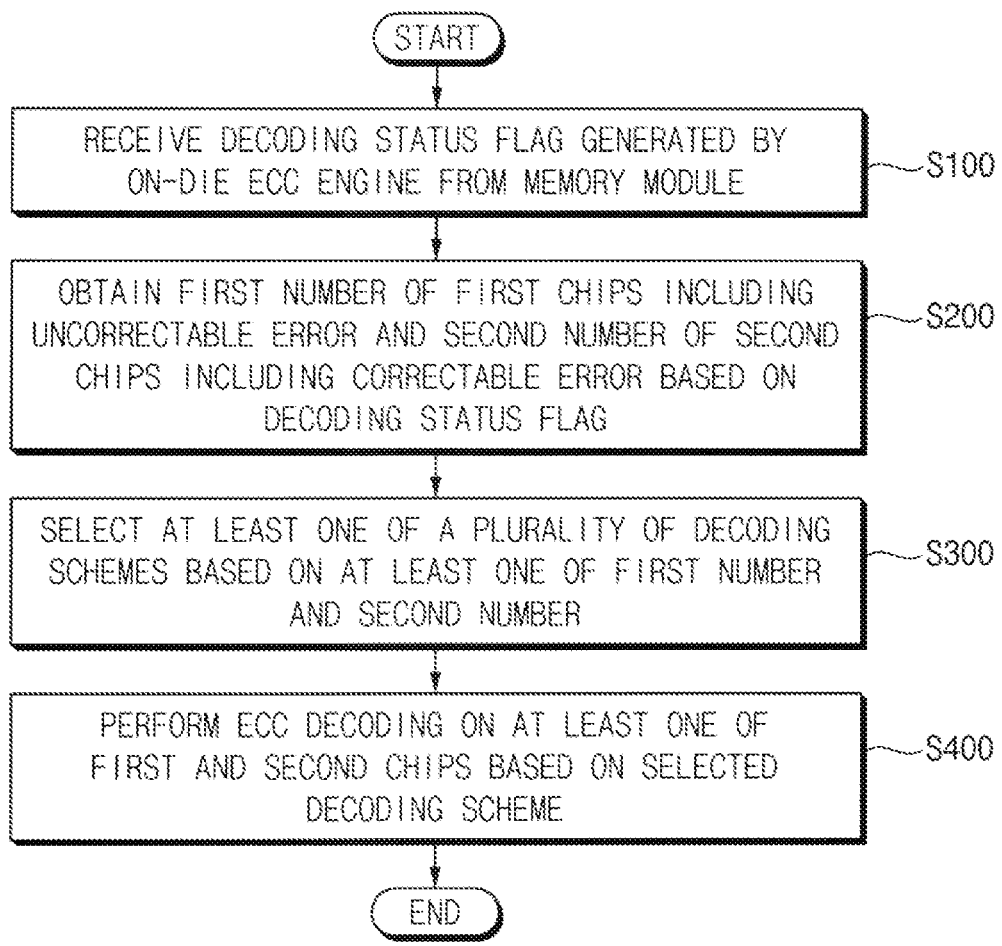
FIG. 1 is a flowchart illustrating a method of operating a memory controller according to some example embodiments.

Various example embodiments will be described more fully with reference to the accompanying drawings, in which some of the example embodiments are shown. The present disclosure may, however, be embodied in many different forms and should not be construed as limited to those embodiments set forth herein. Like reference numerals refer to like elements throughout this application.

Some aspects of the present disclosure provide methods of operating a memory controller according to some example embodiments, as seen in FIG. 1, which is a flowchart illustrating such a method. The memory controller may be included in a memory system that also includes a memory module that is controlled by the memory controller. In some embodiments, the memory module includes a plurality of data chips and at least one parity chip, and each of the plurality of data chips and the at least one parity chip includes an on-die ECC engine. The memory controller includes a system ECC engine. Detailed configurations of the memory system, the memory controller and the memory module will be described with reference to FIGS. 2 through 14.

Referring to FIG. 1, in a method of operating a memory controller according to some example embodiments, the memory controller may be applied, employed, operated, or driven to perform an error correction code (ECC) decoding. Example embodiments may be referred to or described herein as methods of operating a memory system and/or methods of performing an ECC decoding on a memory module included in a memory system.

The memory controller may receive a decoding status flag from the memory module (step S100). The decoding status flag may be generated by the on-die ECC engine. The decoding status flag may represent or indicate whether each memory chip includes an uncorrectable error (UE) that is uncorrectable by the on-die ECC engine, and/or whether each memory chip includes a correctable error (CE) that is correctable by the on-die ECC engine. Stated differently, errors in decoding may be classified as uncorrectable errors that cannot be corrected by the on-die ECC engine, or as correctable errors that can be corrected by the on-die ECC engine.

The memory controller may obtain a first number and a second number based on the decoding status flag (step S200). The first number may represent a number (or quantity) of first chips among the plurality of data chips and the at least one parity chip with an uncorrectable error. The second number represents the number (or quantity) of second chips among the plurality of data chips and the at least one parity chip with a correctable error. In other words, the decoding status flag may include information associated with or related to the uncorrectable errors that are uncorrectable by the on-die ECC engine and the correctable errors that are correctable by the on-die ECC engine.

The memory controller may select at least one of a plurality of decoding schemes based on at least one of the first number and the second number (step S300). The system ECC engine included in the memory controller may perform the ECC decoding on at least one of the first chip and the second chip based on the selected decoding scheme (step S400). In other words, the ECC decoding may be performed by selecting a decoding scheme that is suitable or appropriate for a current situation (or status) and/or occurrences of errors in the in the memory module. Steps S300 and S400 will be described in greater detail with reference to FIGS. 15 through 23.

Figure 2:
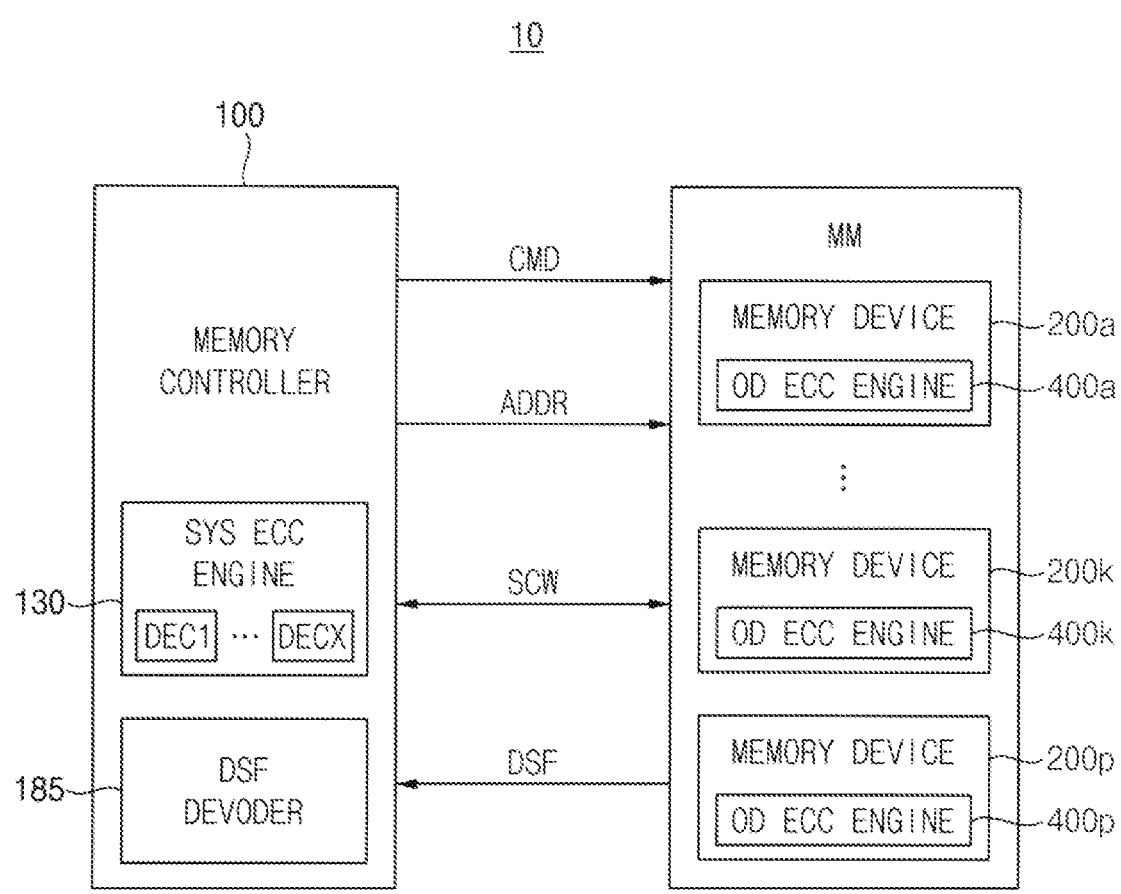
FIG. 2 is a block diagram illustrating a memory controller and a memory system including the memory controller according to some example embodiments.

FIG. 2 is a block diagram illustrating a memory controller and a memory system including the memory controller according to some example embodiments.

Referring to FIG. 2, a memory system 10 may include a memory controller 100 and a memory module MM. The memory module MM may include a plurality of memory chips 200a to 200k (e.g., 200a, 200b, 200c, . . . , 200k) and 200p. The plurality of memory chips 200a to 200k and 200p may include a plurality of data chips 200a to 200k and at least one parity chip 200p. Each of the plurality of memory chips 200a to 200k and 200p may be referred to as a semiconductor memory device or a memory device.

The memory controller 100 may control an overall operation of the memory system 10. The memory controller 100 may control an overall data exchange between an external host device and the plurality of memory chips (or memory devices) 200a to 200k and 200p. For example, the memory controller 100 may write data in the plurality of memory chips 200a to 200k and 200p and/or read data from the plurality of memory chips 200a to 200k and 200p in response to a request from the host. Alternatively or additionally, the memory controller 100 may issue operation commands to the plurality of memory chips 200a to 200k and 200p for controlling the plurality of memory chips 200a to 200k and 200p.

In some example embodiments, each of the plurality of memory chips 200a to 200k and 200p may include a volatile memory including volatile memory cells, such as a dynamic random access memory (DRAM).

In some example embodiments, the number of the plurality of data chips 200a to 200k may be eight or sixteen. However, the number of the data chips 200a to 200k is not limited thereto, and may be more than eight or sixteen, or less than eight or sixteen, and may be a power of two, or may not be a power of two. In some example embodiments, each of the data chips 200a to 200k may be referred to as a data memory, and each of the parity chip 200p may be referred to as an ECC memory or a redundant memory.

The memory controller 100 may transmit a command CMD and an address ADDR to the memory module MM, may exchange a codeword set SCW with the memory module MM, and may receive a decoding status flag DSF from the memory module MM.

The memory controller 100 may include a system (SYS) ECC engine (or a first ECC engine) 130 and a decoding status flag (DSF) decoder 185. Each of the plurality of memory chips 200a to 200k and 200p may include a respective one of a plurality of on-die (OD) ECC engines (or second ECC engines) 400a to 400k (e.g., 400a, 400b, 400c, . . . , 400k) and 400p that generate the decoding status flag DSF.

In a write operation of the memory system 10, the system ECC engine 130 may generate a parity data set by performing an ECC encoding on a user data set and a meta data using a parity generation matrix, and may provide the codeword set SCW including the user data set, the meta data and the parity data set to the memory module MM. The user data set (or main data) may be stored in the data chips 200a to 200k, and the meta data and parity data set may be stored in the parity chip 200p.

In a read operation of the memory system 10, the decoding status flag decoder 185 may receive the decoding status flag DSF from the memory module MM, and may check, based on the decoding status flag DSF, whether an uncorrectable error that is uncorrectable by the on-die ECC engines 400a to 400k and 400p and/or a correctable error that is correctable by the on-die ECC engines 400a to 400k and 400p are included in the codeword set SCW (e.g., in the user data set). In addition, when the uncorrectable error that is uncorrectable by the on-die ECC engines 400a to 400k and 400p and/or the correctable error that is correctable by the on-die ECC engines 400a to 400k and 400p are included in the codeword set SCW, the decoding status flag decoder 185 may check, based on the decoding status flag DSF, the type and number of chips including the uncorrectable error(s) and/or the correctable error(s). The system ECC engine 130 may select at least one of a plurality of decoding schemes DEC1, . . . , DECX based on the type and number of chips including the uncorrectable error(s) and/or the correctable error(s), and may correct an error (or error bit) in the codeword set SCW by performing an ECC decoding on the codeword set SCW using the selected decoding scheme. In other words, the decoding status flag decoder 185 may perform steps S100 and S200 in FIG. 1, and the system ECC engine 130 may perform steps S300 and S400 in FIG. 1.

Although FIG. 2 illustrates that one decoding status flag DSF is received from the memory module MM, example embodiments are not limited thereto. For example, each memory chip (or each on-die ECC engine included in each memory chip) may generate one decoding status flag, and a plurality of decoding status flags may be received from the memory module MM. In this example, each decoding status flag may include error information of a corresponding memory chip. For example, a first decoding status flag DSF may include error information of a first memory chip 200a, a second decoding status flag DSF may include error information of a second memory chip 200b, and so on.

Figure 3:
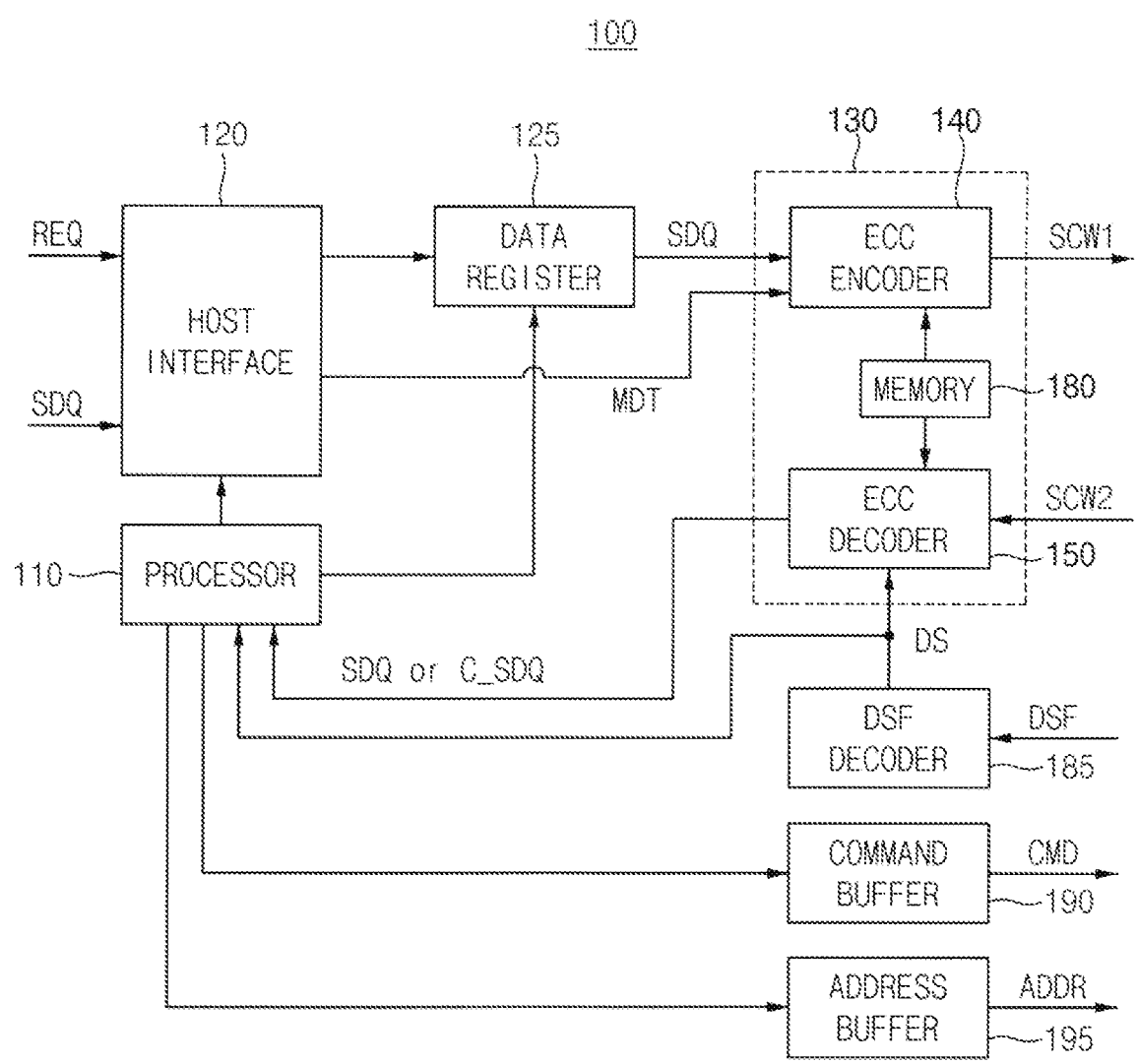
FIG. 3 is a block diagram illustrating an example of a memory controller according to some example embodiments.

FIG. 3 is a block diagram illustrating an example of a memory controller according to example embodiments.

Referring to FIG. 3, a memory controller 100 may include a processor 110, a host interface 120, a data register 125, a system ECC engine 130, a decoding status flag decoder 185, a command buffer 190 and an address buffer 195. The system ECC engine 130 may include an ECC encoder 140, an ECC decoder 150 and a memory 180.

The host interface 120 may receive a request REQ and a user data set SDQ from an external host device, may generate meta data MDT associated with the user data set SDQ, may provide the user data set SDQ to the data register 125, and may provide the meta data MDT to the ECC encoder 140. The data register 125 may continuously (and/or sequentially and/or serially) output the user data set SDQ to the ECC encoder 140.

The ECC encoder 140 may generate a first codeword set SCW1 by performing an ECC encoding on the user data set SDQ and the meta data MDT using a parity generation matrix. The first codeword set SCW1 may correspond to write data that is provided to the memory module MM and is stored in the memory module MM.

The ECC decoder 150 may generate the user data set SDQ and/or a corrected user data set C_SDQ by performing an ECC decoding on a second codeword set SCW2 using a parity check matrix, and may provide the user data set SDQ and/or the corrected user data set C_SDQ to the processor 110. The second codeword set SCW2 may correspond to read data that is retrieved from the memory module MM.

The memory 180 may store the parity generation matrix and the parity check matrix.

The processor 110 may receive the user data set SDQ and/or the corrected user data set C_SDQ, and may control the system ECC engine 130, the command buffer 190 and/or the address buffer 195. For example, the processor 110 may include a central processing unit (CPU).

The command buffer 190 may store the command CMD corresponding to the request REQ, and may transmit the command CMD to the memory module MM under a control of the processor 110. The address buffer 195 may store the address ADDR, and may transmit the address ADDR to the memory module MM under a control of the processor 110.

The DSF decoder 185 may generate a decoding signal DS by decoding the decoding status flag DSF received from the memory module MM, and may provide the decoding signal DS to the ECC decoder 150 and the processor 110. The decoding signal DS may represent the type, location and number of errors included in the second codeword set SCW2 (e.g., in the user data set SDQ provided from the memory module MM). The ECC decoder 150 and/or the processor 110 may select at least one of the plurality of decoding schemes DEC1 to DECX based on the decoding signal DS, and the ECC decoder 150 may perform the ECC decoding based on the selected decoding scheme. In other words, step S300 in FIG. 1 may be performed by the ECC decoder 150, or may be performed under a control of the processor 110.

Figure 4A:
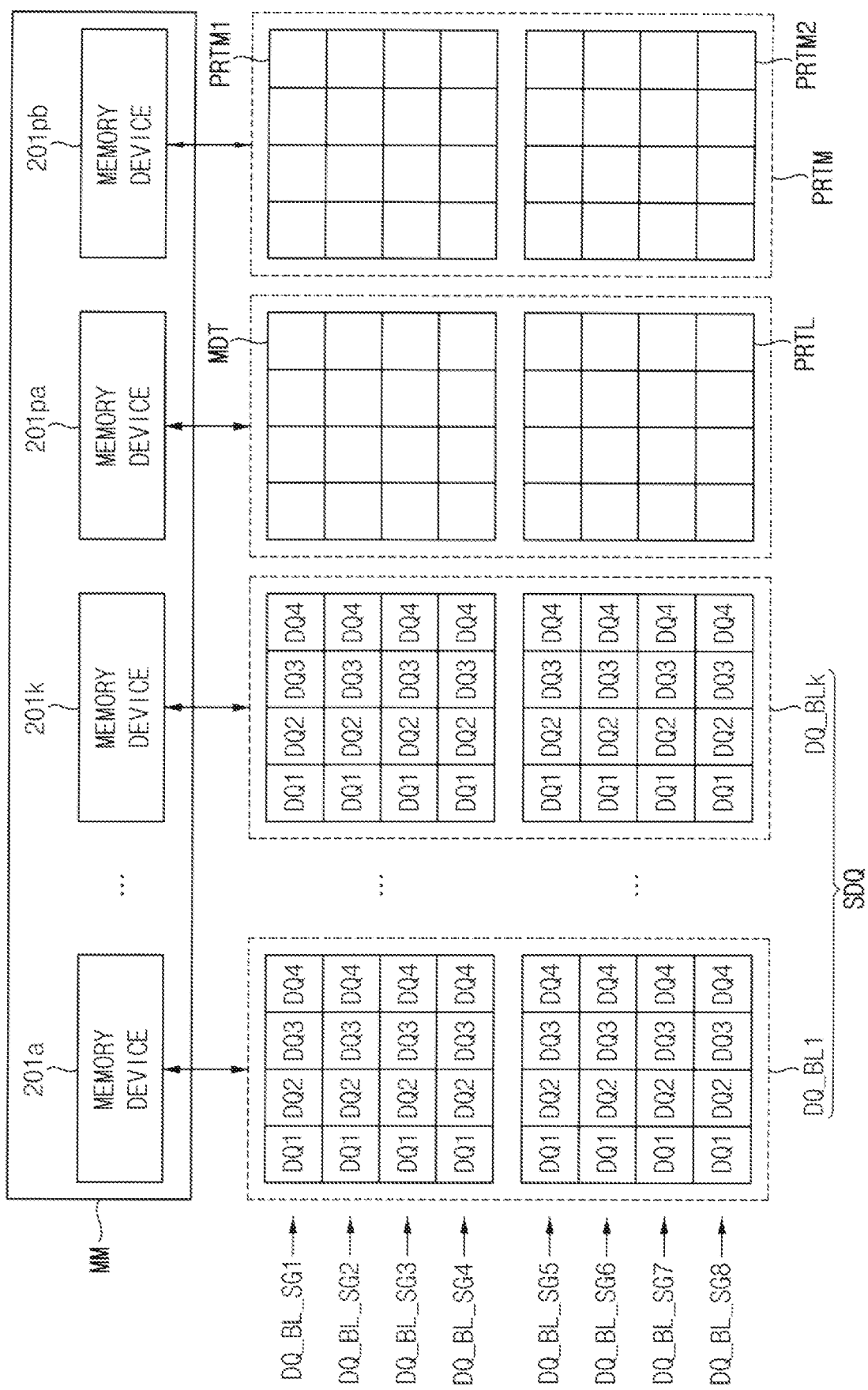
FIGS. 4A and 4B are diagrams illustrating examples of data sets corresponding to a plurality of burst lengths in a memory system according to some example embodiments.
Figure 4B:
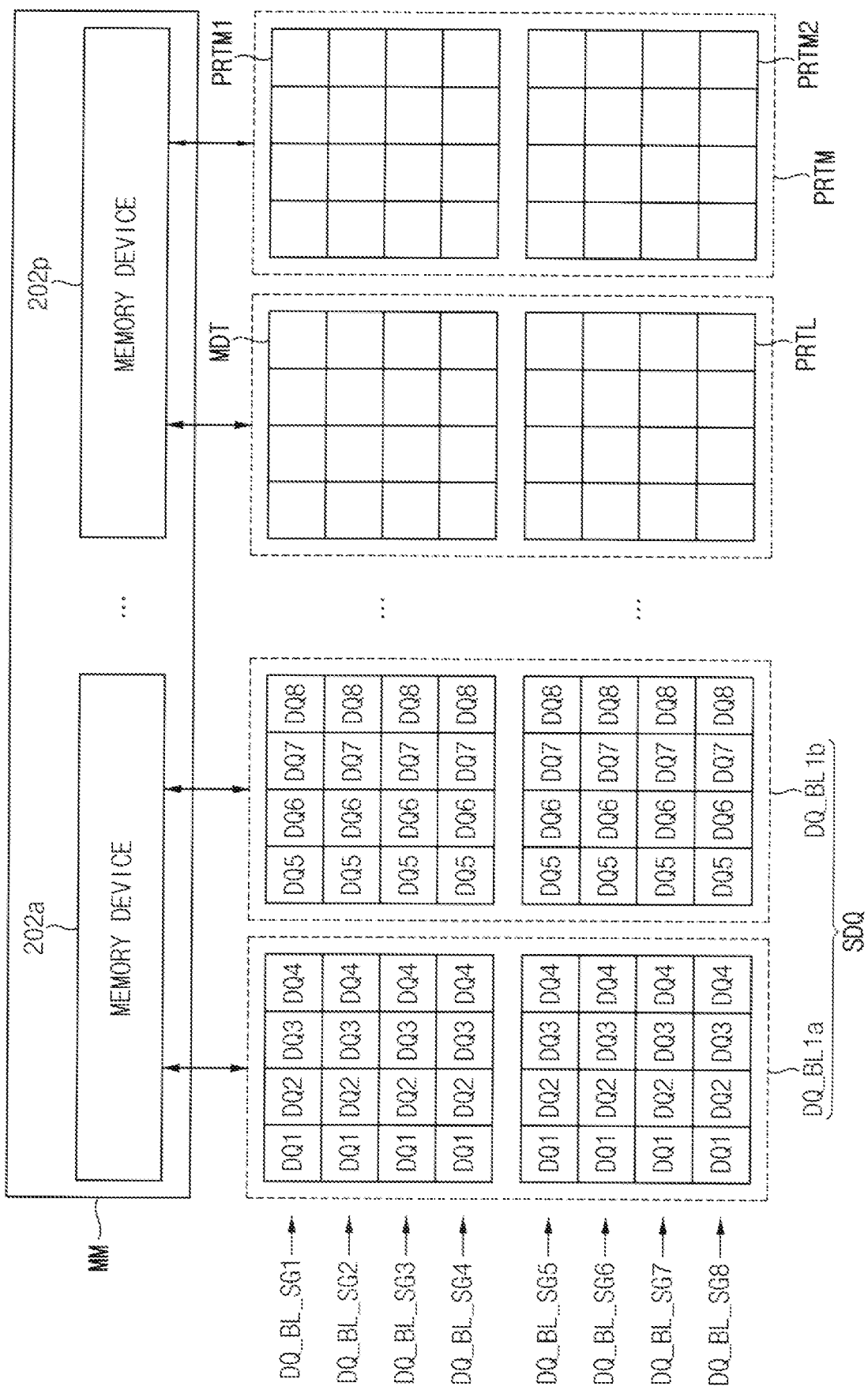

FIGS. 4A and 4B are diagrams illustrating examples of data sets corresponding to a plurality of burst lengths in a memory system according to example embodiments.

Referring to FIG. 4A, a memory module MM may include a plurality of memory chips 201a to 201k (e.g., 201a, 201b, 201c, . . . , 200k), 201pa and 201pb. The plurality of memory chips 201a to 201k, 201pa and 201pb may include a plurality of data chips 201a to 201k, a first parity chip 201pa and a second parity chip 201pb. For example, the plurality of data chips 201a to 201k may include first to N-th data chips, where N is a natural number equal to or greater than two. In the example of FIG. 4A, one memory chip may be connected to four data input/output (I/O) pins, and four data signals DQ1, DQ2, DQ3 and DQ4 may be input to and/or output from one memory chip. The example of FIG. 4A may be referred to as x4 structure.

As illustrated in FIG. 4A, each of the data chips 201a to 201k and the parity chips 201pa and 201pb may perform a burst operation.

Herein, a burst operation may represent an operation of writing and/or reading a large amount of data by sequentially increasing and/or decreasing an initial address provided from the memory controller 100. A basic unit of the burst operation may be referred to a burst length (BL).

Each of data sets DQ_BL1, . . . , DQ_BLk corresponding to a plurality of burst lengths may be input to and/or output from each of the data chips 201a to 201k. Each of the data sets DQ_BL1 to DQ_BLk may include data segments DQ_BL SG1, DQ_BL SG2, DQ_BL SG3, DQ_BL SG4, DQ_BL SG5, DQ_BL SG6, DQ_BL SG7 and DQ_BL SG8 corresponding to each of the plurality of burst lengths. The data sets DQ_BL1 to DQ_BLk may correspond to the user data set SDQ. For example, FIG. 4A illustrates an example where the burst length is eight, however, example embodiments and the present disclosure are not limited thereto.

While the burst operation is performed on each of the data chips 201a to 201k, the meta data MDT and a first parity data PRTL corresponding to the plurality of burst lengths may be input to and/or output from the first parity chip 201pa, and a second parity data PRTM corresponding to the plurality of burst lengths may be input to and/or output from the second parity chip 201pb. The second parity data PRTM may include a first sub parity data PRTM1 and a second sub parity data PRTM2.

The first parity data PRTL may be referred to as error locator parity data, and may be associated with locations of error bits in the user data set SDQ. The second parity data PRTM may be referred to as error magnitude parity data, and may be associated with magnitudes (or numbers or counts) of the error bits in the user data set SDQ. FIG. 4A illustrates an example where the error locator parity data and the error magnitude parity data are stored in different parity chips.

Referring to FIG. 4B, a memory module MM may include a plurality of memory chips 202a to 202p. The descriptions repeated with FIG. 4A will be omitted.

The plurality of memory chips 202a to 202p may include a plurality of data chips 202a and a first parity chip 202p. For example, the plurality of data chips 202a may include first to M-th data chips, where M is a natural number equal to or greater than two. In the example of FIG. 4B, one memory chip may be connected to eight data I/O pins, and eight data signals DQ1, DQ2, DQ3, DQ4, DQ5, DQ6, DQ7 and DQ8 may be input to and/or output from one memory chip. The example of FIG. 4B may be referred to as x8 structure.

The size of data sets DQ_BL1a and DQ_BL1b that are input to and/or output from one memory chip in FIG. 4B may be twice the size of the data set DQ_BL1 that are input to and/or output from one memory chip in FIG. 4A. When the memory module MM of FIG. 4A and the memory module MM of FIG. 4B include the same number of data I/O pins, the number of the data chips 202a in FIG. 4B may be a half of the number of the data chips 201a to 201k in FIG. 4A (e.g., M=N/2). For example, N=16 and M=8. In addition, FIG. 4B illustrates an example where the error locator parity data and the error magnitude parity data are stored in one parity chip.

Figure 5:
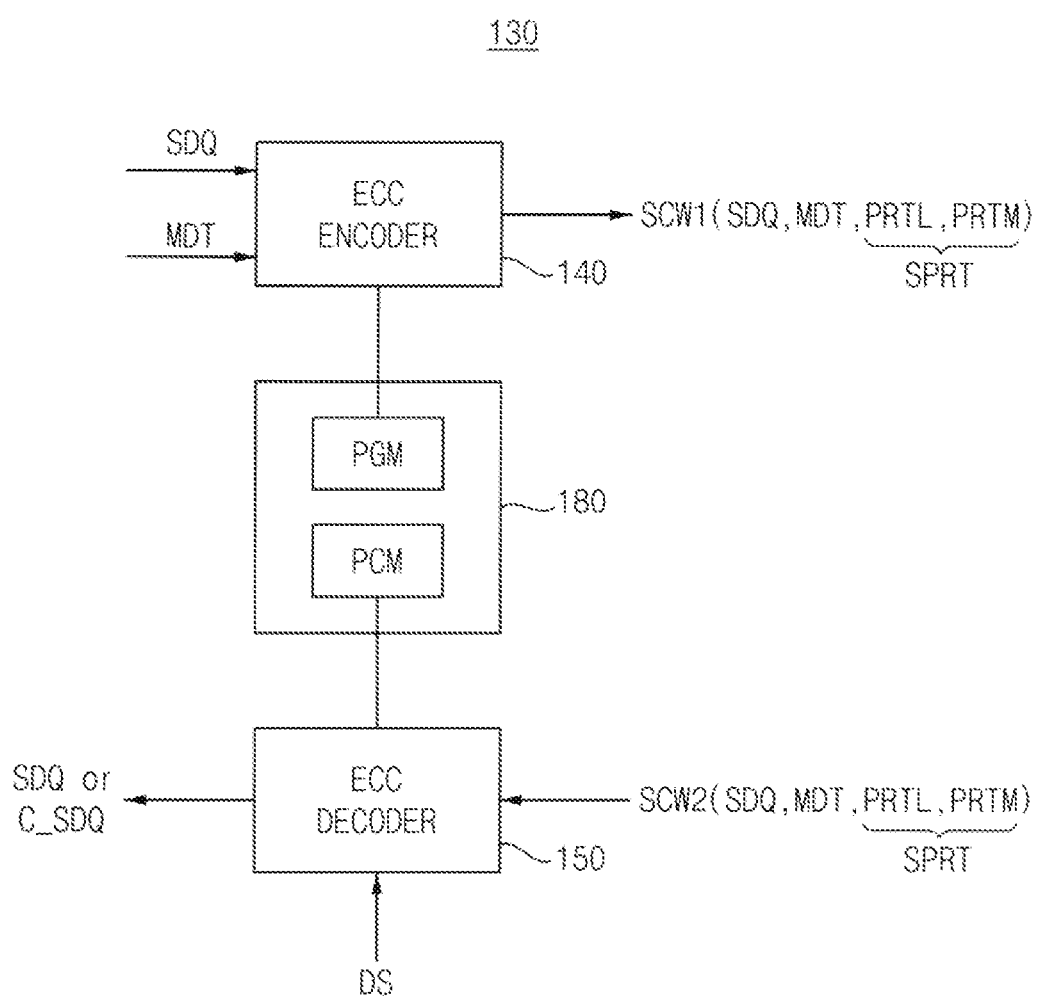
FIG. 5 is a block diagram illustrating an example of a system ECC engine included in a memory controller according to some example embodiments.

FIG. 5 is a block diagram illustrating an example of a system ECC engine included in a memory controller according to some example embodiments.

Referring to FIG. 5, a system ECC engine 130 may include an ECC encoder 140, an ECC decoder 150 and a memory 180. The memory 180 may be referred to as an ECC memory. Although the ECC encoder 140 and the ECC decoder 150 are illustrated as separate components, example embodiments and the present disclosure are not limited thereto.

The ECC encoder 140 may perform the ECC encoding on the user data set SDQ and the meta data MBT using a parity generation matrix PCM to generate a parity data set SPRT including the first parity data PRTL and the second parity data PRTM, and may output the first codeword set SCW1 including the user data set SDQ, the meta data MBT and the parity data set SPRT.

The ECC decoder 150 may receive, from the memory module MM, the second codeword set SCW2 including the user data set SDQ, the meta data MBT and the parity data set SPRT, and may receive the decoding signal DS from the decoding status flag decoder 185. The ECC decoder 150 may select at least one of the plurality of decoding schemes DEC1 to DECX based on the decoding signal DS, may perform the ECC decoding on the second codeword set SCW2 using a parity check matrix PCM and the selected decoding scheme to generate the corrected user data set C_SDQ, and may output the user data set SDQ and/or the corrected user data set C_SDQ.

FIGS. 6A, 6B, 6C and 6D are diagrams illustrating an example of a parity generation matrix used in a system ECC engine of FIG. 5.

Figure 6A:
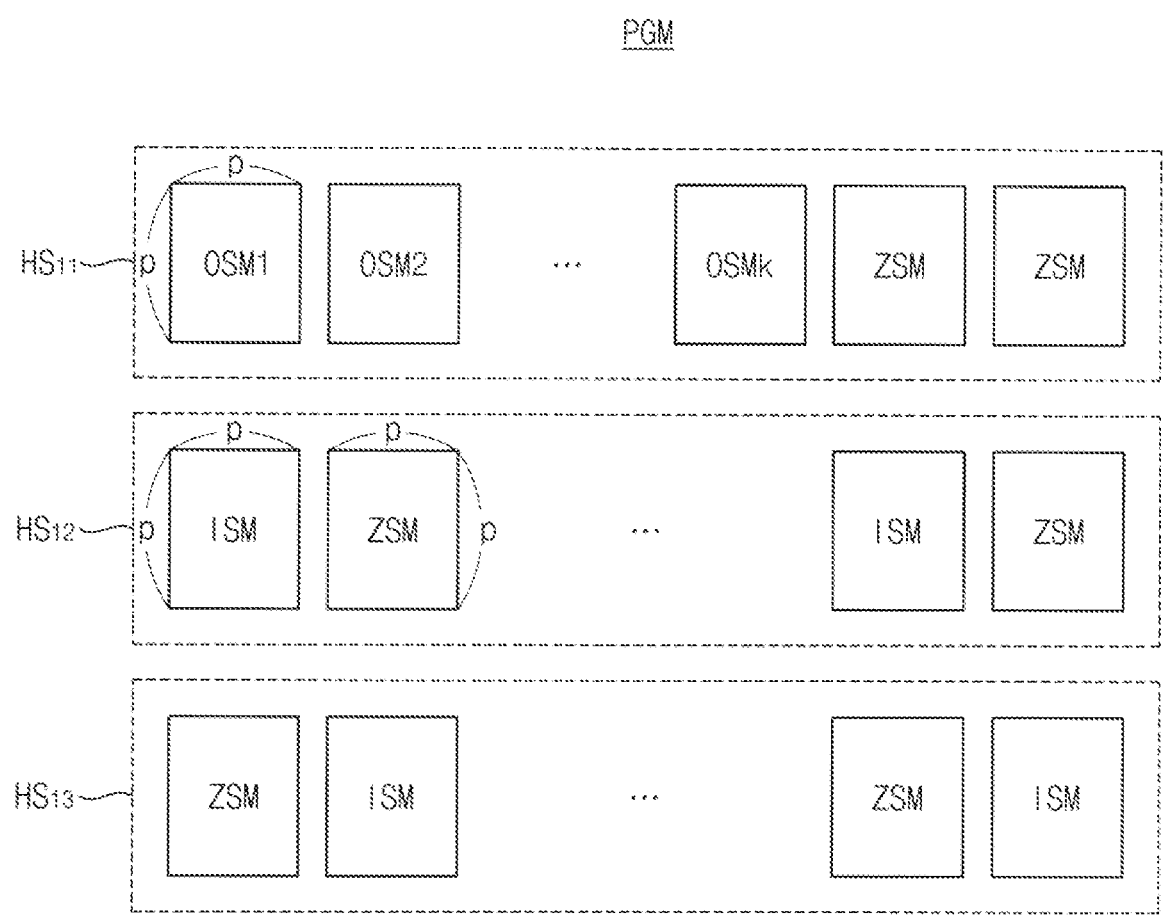

Referring to FIG. 6A, a parity generation matrix PGM may include a first parity sub matrix $HS_{11}$, a second parity sub matrix $HS_{12}$ and a third parity sub matrix $HS_{13}$.

The first parity sub matrix $HS_{11}$ may include a plurality of offset sub matrices OSM1 to OSMk (e.g., OSM1, OSM2, ..., OSMk) corresponding to the data chips 201a to 201k in FIG. 4A and the data chips 202a in FIG. 4B, along with two zero sub matrices ZSM corresponding to the parity chips 201pa and 201pb in FIG. 4A and the parity chip 202p in FIG. 4B. For example, each of the offset sub matrices OSM1 to OSMk and the zero sub matrices ZSM may include p*p elements, where p is a natural number greater than or equal to two.

The second parity sub matrix $HS_{12}$ may include a plurality of unit (or identity) sub matrices ISM and a plurality of zero sub matrices ZSM that are alternately arranged. For example, each of the unit sub matrices ISM and the zero sub matrices ZSM may include p*p elements. The third parity sub matrix $HS_{13}$ may include a plurality of zero sub matrices ZSM and a plurality of unit sub matrices ISM that are alternately arranged. For example, each of the zero sub matrices ZSM and the unit sub matrices ISM may include p*p elements. The second parity sub matrix $HS_{12}$ and the third parity sub matrix $HS_{13}$ may be arranged differently from each other.

Figures 6B, 6C:
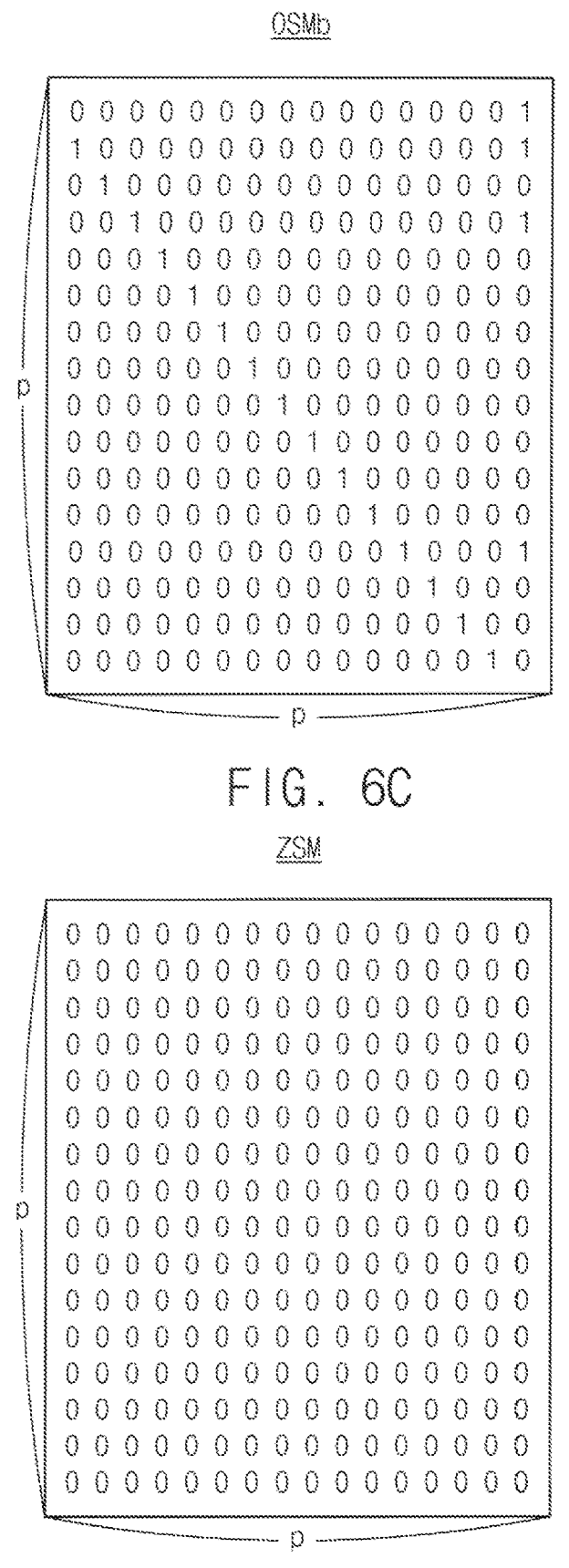

Referring to FIG. 6B, an example of a base offset sub matrix OSMb, which is used for generating the offset sub matrices OSM1 to OSMk included in the first parity sub matrix $HS_{11}$ in FIG. 6A, is illustrated. The base offset sub matrix OSMb may include (p+3) high level elements (represented with '1' in FIG. 6B). For example, the offset sub matrix OSM1 among the offset sub matrices OSM1 to OSMk may be obtained by powers of the base offset sub matrix OSMb. The offset sub matrix OSM2 among the offset sub matrices OSM1 to OSMk may be obtained by multiplying the offset sub matrix OSM1 and a sub matrix obtained by powers of the base offset sub matrix OSMb by an offset.

Referring to FIG. 6C, an example of a zero sub matrix ZSM included in the first, second, and third parity sub matrices $HS_{11}$, $HS_{12}$ and $HS_{13}$ in FIG. 6A is illustrated. In the zero sub matrix ZSM, all of elements may be zero ('0').

Referring to FIG. 6D, an example of a unit sub matrix ISM included in the second and third parity sub matrices $HS_{12}$ and $HS_{13}$ in FIG. 6A is illustrated. The unit sub matrix ISM may includes p high level elements arranged in a diagonal direction, for example along a major diagonal of the matrix. Elements other than the high level elements may be zero.

In the example of FIGS. 6A, 6B, 6C and 6D, p may be sixteen. For example, p may correspond to the number of bits of the data sets DQ_BL1 to DQ_BLk that are input to and/or output from each of the data chips 201a to 201k in FIG. 4A during a single burst operation, and/or may correspond to the number of bits of the data sets DQ_BL1a and DQ_BL1b that are input to and/or output from each of the data chips 202a in FIG. 4B during a single burst operation. In addition, the number of non-zero elements in the first parity sub matrix $HS_{11}$ may be greater than the number of non-zero elements in the second parity sub matrix $HS_{12}$ or the number of non-zero elements in the third parity sub matrix $HS_{13}$.

FIG. 7 is a block diagram illustrating an example of an ECC encoder included in a system ECC engine of FIG. 5.

Referring to FIG. 7, an ECC encoder 140 may include an error locator parity generator 141, a first error magnitude parity generator 143, a second error magnitude parity generator 145 and a buffer 147.

The error locator parity generator 141 may perform an ECC encoding on the user data set SDQ and the meta data MDT using the first parity sub matrix $HS_{11}$ to generate the first parity data PRTL, which may be used for determining locations of errors. The error locator parity generator 141 may provide the first parity data PRTL to the buffer 147. The first parity data PRTL may be referred to as error locator parity data.

The error locator parity generator 141 may generate the first parity data PRTL by performing a matrix-multiplication operation on the user data set SDQ and the meta data MDT with the first parity sub matrix $HS_{11}$. If a vector representation of the user data set SDQ and the meta data MDT corresponds to ms, and if a vector representation of the first parity data PRTL corresponds to $p_L$, then $p_L = HS_{11}[ms\ 0]^T$. Here, T represents a transposed matrix, and 0 represents a zero matrix.

The first error magnitude parity generator 143 may perform an ECC encoding on the user data set SDQ and the meta data MDT using the second parity sub matrix $HS_{12}$ to generate the first sub parity data PRTM1, which may be used for determining the number of bit errors. The first error magnitude parity generator 143 may provide the first sub parity data PRTM1 to the buffer 147. The first sub parity data PRTM1 may be referred to as a first error magnitude parity data.

The first error magnitude parity generator 143 may generate the first sub parity data PRTM1 by performing a matrix-multiplication operation on the user data set SDQ and the meta data MDT with the second parity sub matrix $HS_{12}$. If a vector representation of the first sub parity data PRTM1 corresponds to $p_{M1}$, then $p_{M1} = HS_{11}[ms\ p_L\ 0]^T$.

The second error magnitude parity generator 145 may perform an ECC encoding on the user data set SDQ and the meta data MDT using the third parity sub matrix $HS_{13}$ to generate the second sub parity data PRTM2, which may be used for determining the number of bit errors. The second error magnitude parity generator 145 may provide the second sub parity data PRTM2 to the buffer 147. The second sub parity data PRTM2 may be referred to as a second error magnitude parity data.

The second error magnitude parity generator 145 may generate the second sub parity data PRTM2 by performing a matrix-multiplication operation on the user data set SDQ and the meta data MDT with the third parity sub matrix HS 13. If a vector representation of the second sub parity data PRTM2 corresponds to $p_{M2}$, then $p_{M2} = HS_{13}[ms\ p_L\ 0]^T$. The first sub parity data PRTM1 and the second sub parity data PRTM2 may be included in the second parity data PRTM.

The buffer 147 may receive the user data set SDQ, the meta data MDT, the first parity data PRTL and the second parity data PRTM including the first sub parity data PRTM1 and the second sub parity data PRTM2, and may provide the first codeword set SCW1 including the user data set SDQ, the meta data MDT, the first parity data PRTL, the first sub parity data PRTM1 and the second sub parity data PRTM2 to the memory module MM.

Figure 8A:
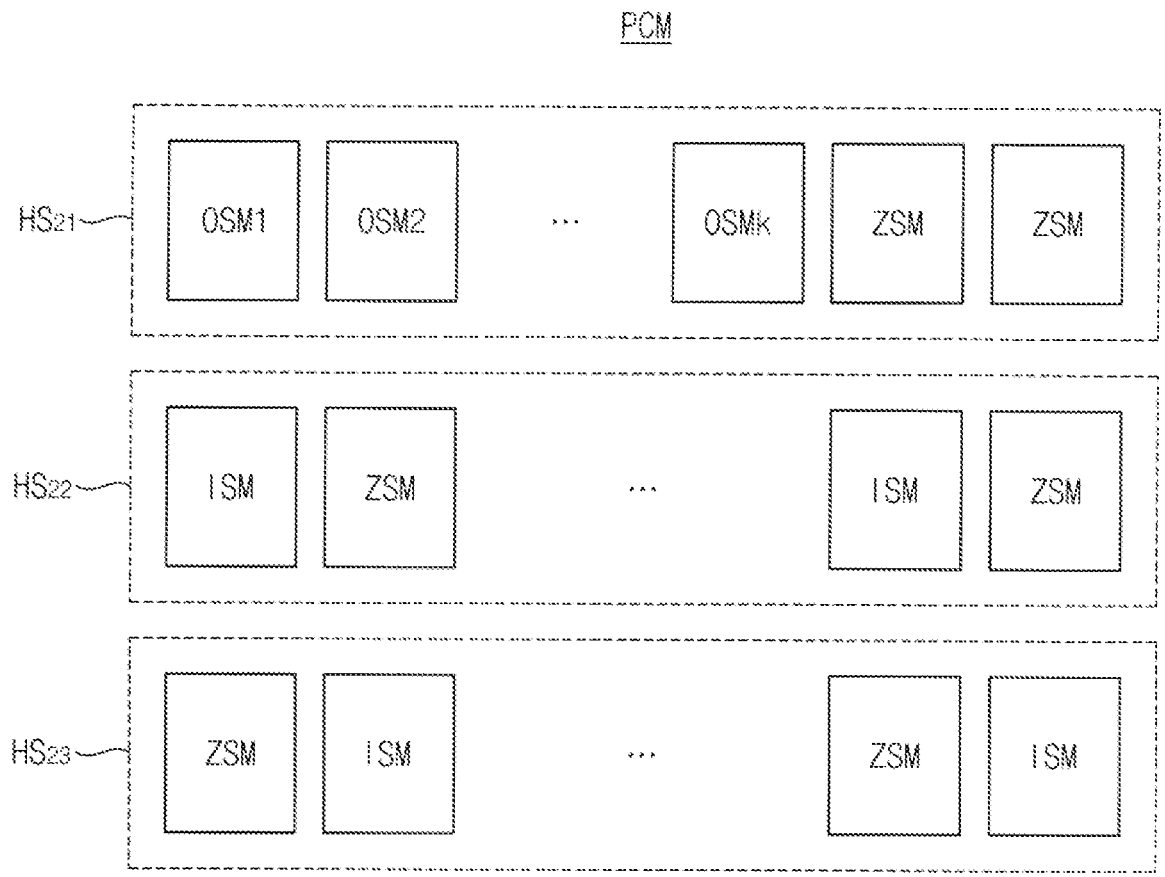
FIGS. 8A and 8B are diagrams illustrating an example of a parity check matrix used in a system ECC engine of FIG. 5.
Figure 8B:
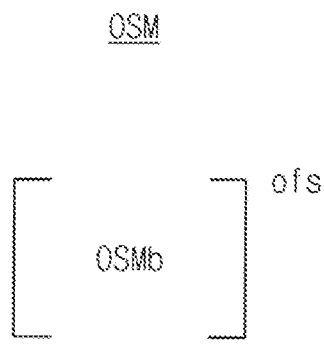

FIGS. 8A and 8B are diagrams illustrating an example of a parity check matrix used in a system ECC engine of FIG. 5.

Referring to FIG. 8A, a parity check matrix PCM may include a first parity sub matrix $HS_{21}$, a second parity sub matrix $HS_{22}$ and a third parity sub matrix $HS_{23}$.

The first parity sub matrix $HS_{21}$ may include offset sub matrices OSM1 to OSMk (e.g., OSM1, OSM2, . . . , OSMk) corresponding to the memory chips 200a to 200k, and zero sub matrices ZSM. The second parity sub matrix $HS_{22}$ may include unit sub matrices ISM and zero sub matrices ZSM that are alternately arranged. The third parity sub matrix $HS_{23}$ may include zero sub matrices ZSM and unit sub matrices ISM that are alternately arranged. For example, each of the offset sub matrices OSM1 to OSMk, the zero sub matrices ZSM and the unit sub matrices ISM may include p*p elements.

As illustrated in FIGS. 6A and 8A, the first, second and third parity sub matrices $HS_{21}$, $HS_{22}$ and $HS_{23}$ may be substantially the same as the first, second and third parity sub matrices $HS_{11}$, $HS_{12}$ and $HS_{13}$, respectively. In some example embodiments, the ECC encoder 140 and the ECC decoder 150 in FIG. 5 may share the parity generation matrix PGM, and may perform the ECC encoding and the ECC decoding, respectively. In other words, the parity generation matrix PGM in FIG. 5 may be equivalent to the parity check matrix PCM in FIG. 5.

The ECC decoder 150 may correct errors included in the user data set SDQ by units of symbol (e.g., on a symbol-by-symbol basis) using the parity check matrix PCM. For example, the ECC decoder 150 may correct multiple errors included in one symbol of the user data set SDQ using the parity check matrix PCM. Each of the data sets DQ_BL1 to DQ_BLk, DQ_BL1a and DQ_BL1b may correspond to one symbol.

Referring to FIG. 8B, an example of an offset sub matrix OSM, which corresponds to one of the offset sub matrices OSM1 to OSMk included in the first parity sub matrix $HS_{21}$ in FIG. 8A, is illustrated. The offset sub matrix OSM may be obtained by powers of the base offset sub matrix OSMb by an offset ofs.

As illustrated in FIGS. 8A and 8B, the number of non-zero elements in the first parity sub matrix $HS_{21}$ may be greater than the number of non-zero elements in the second parity sub matrix $HS_{22}$ or the number of non-zero elements in the third parity sub matrix $HS_{23}$. Therefore, the ECC decoder 150 in FIG. 5 may generate a first sub syndrome SDR_M1 and a second sub syndrome SDR_M2 using the second parity sub matrix $HS_{22}$ and the third parity sub matrix $HS_{23}$, and may generate a second syndrome SDR_M by summing the first sub syndrome SDR_M1 and the second sub syndrome SDR_M2.

Figure 9:
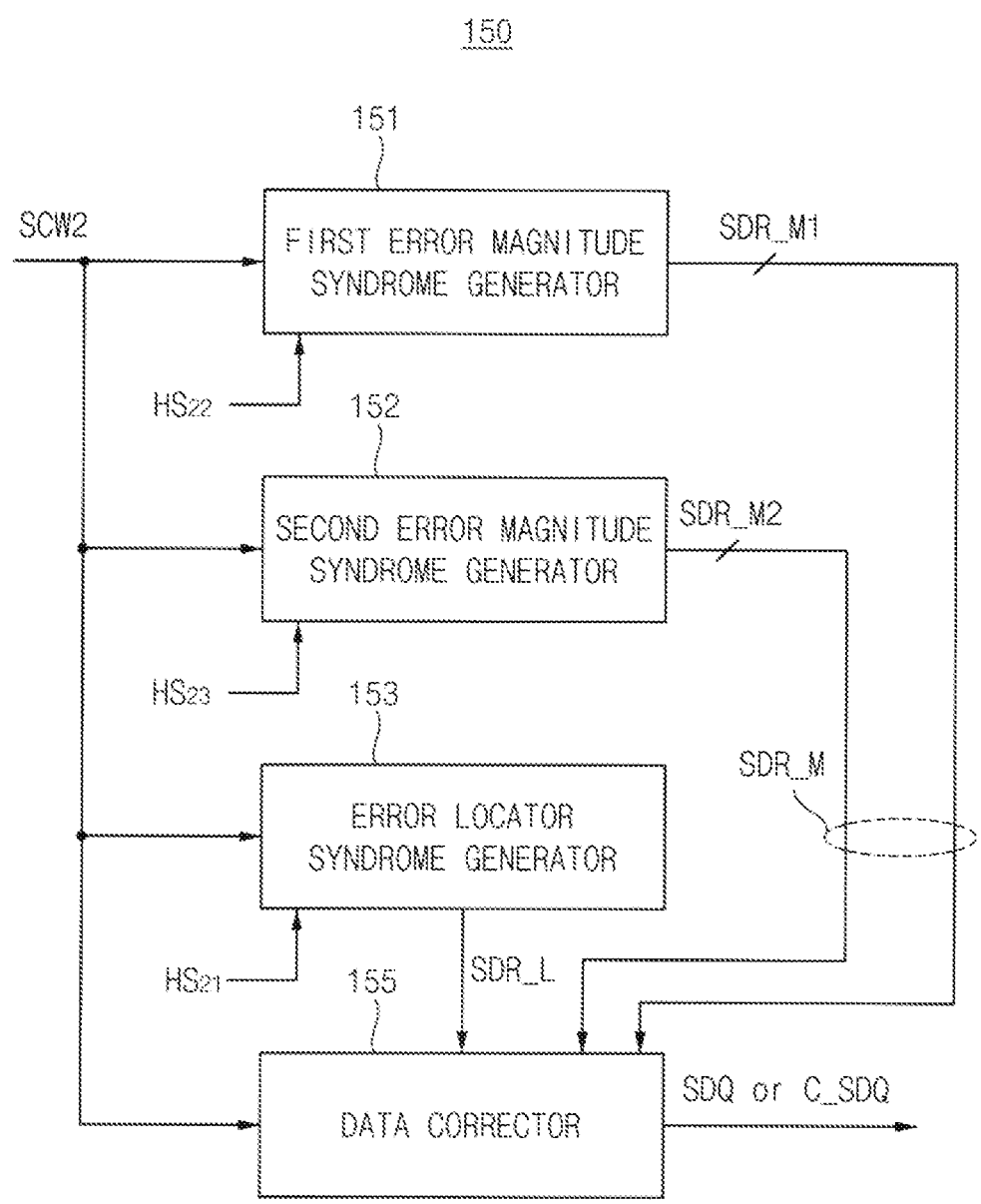
FIG. 9 is a block diagram illustrating an example of an ECC decoder included in a system ECC engine of FIG. 5.

FIG. 9 is a block diagram illustrating an example of an ECC decoder included in a system ECC engine of FIG. 5.

Referring to FIG. 9, an ECC decoder 150 may include a first error magnitude syndrome generator 151, a second error magnitude syndrome generator 152, an error locator syndrome generator 153 and a data corrector 155.

The first error magnitude syndrome generator 151 may generate the first sub syndrome SDR_M1 that represents the number of error bits by performing a matrix-multiplication operation on the second codeword set SCW2 and the second parity sub matrix $HS_{22}$. If a vector representation of the second codeword set SCW2 corresponds to $r^T$, and if a vector representation of the first sub syndrome SDR_M1 corresponds to $SM_{01}$, then $SM_{01}=HS_{22}r^T$.

The second error magnitude syndrome generator 152 may generate the second sub syndrome SDR_M2 that represents the number of error bits by performing a matrix-multiplication operation on the second codeword set SCW2 and the third parity sub matrix $HS_{23}$. If a vector representation of the second sub syndrome SDR_M2 corresponds to $S_{M02}$, then $S_{M02}=HS_{23}r^T$. The first sub syndrome SDR_M1 and the second sub syndrome SDR_M2 may be included in the second syndrome SDR_M, which is an error magnitude syndrome.

The error locator syndrome generator 153 may generate a first syndrome SDR_L that represents positions of errors by performing a matrix-multiplication operation on the second codeword set SCW2 and the first parity sub matrix $HS_{21}$, and may provide the first syndrome SDR_L to the data corrector 155. If a vector representation of the first syndrome SDR_L corresponds to $S_L$, then $S_L=HS_{21}r^T$.

The data corrector 155 may correct correctable error bits in the user data set SDQ included in the second codeword set SCW2 by units of symbol (e.g., on a symbol-by-symbol basis) based on the first syndrome SDR_L and the second syndrome SDR_M to output the corrected user data set C_SDQ. The data corrector 155 may output the user data set SDQ when the second codeword set SCW2 (e.g., the user data set SDQ) includes uncorrectable errors.

In some example embodiments, when the first syndrome SDR_L has zero value and the second syndrome SDR_M has zero value, it may represent that the user data set SDQ included in the second codeword set SCW2 includes no errors. When the first syndrome SDR_L has non-zero value and the second syndrome SDR_M has non-zero value, it may represent that the user data set SDQ included in the second codeword set SCW2 includes correctable errors which can be corrected based on the first syndrome SDR_L and the second syndrome SDR_M. When the first syndrome SDR_L has zero value and the second syndrome SDR_M has non-zero value, it may represent that the user data set SDQ included in the second codeword set SCW2 includes uncorrectable errors which cannot be corrected using the first syndrome SDR_L and the second syndrome SDR_M.

Figure 10:
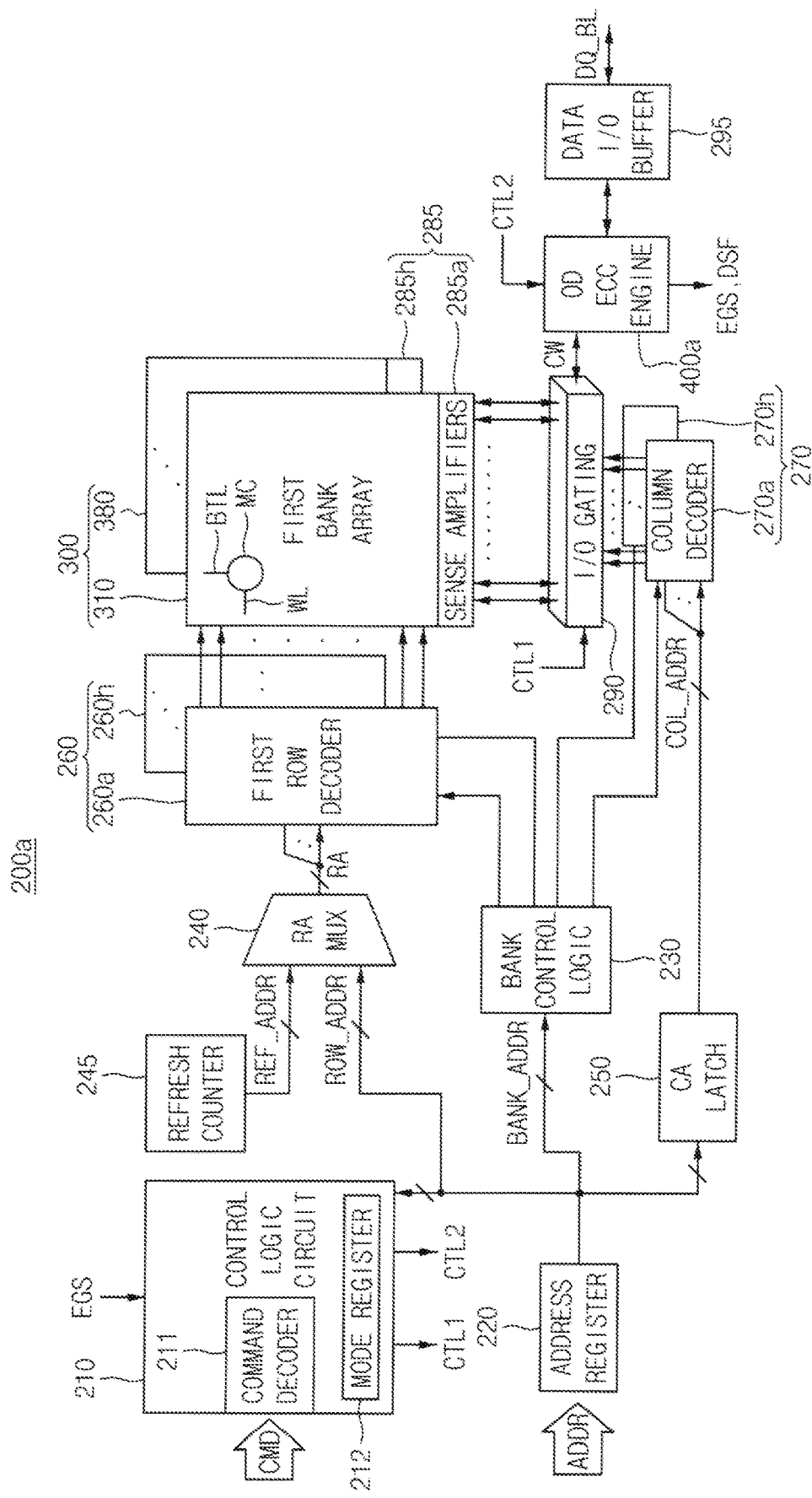
FIG. 10 is a block diagram illustrating an example of a data chip included in a memory module included in a memory system according to some example embodiments.

FIG. 10 is a block diagram illustrating an example of a data chip included in a memory module included in a memory system according to some example embodiments.

Referring to FIG. 10, a data chip 200a may include a control logic circuit 210, an address register 220, a bank control logic circuit 230, a row address multiplexer 240, a column address latch 250, a row decoder 260, a column decoder 270, a memory cell array 300, a sense amplifier unit 285, an input/output (I/O) gating circuit 290, a data I/O buffer 295, an on-die ECC engine 400a and/or a refresh counter 245. The data chip 200a may include a single number of, or a plurality of, each of the above.

The memory cell array 300 may include first to eighth bank arrays 310 to 380 (e.g., first to eighth bank arrays 310, 320, 330, 340, 350, 360, 370 and 380). The row decoder 260 may include first to eighth bank row decoders 260a to 260h connected respectively to the first to eighth bank arrays 310 to 380. The column decoder 270 may include first to eighth bank column decoders 270a to 270h connected respectively to the first to eighth bank arrays 310 to 380. The sense amplifier unit 285 may include first to eighth bank sense amplifiers 285a to 285h connected respectively to the first to eighth bank arrays 310 to 380.

The first to eighth bank arrays 310 to 380, the first to eighth bank row decoders 260a to 260h, the first to eighth bank column decoders 270a to 270h, and the first to eighth bank sense amplifiers 285a to 285h may form first to eighth banks. Each of the first to eighth bank arrays 310 to 380 may include a plurality of wordlines WL, a plurality of bitlines BTL, and a plurality of memory cells MC that are at intersections of the wordlines WL and the bitlines BTL.

Although FIG. 10 illustrates the data chip 200a including eight banks (and eight bank arrays, eight row decoders, and so on), the data chip 200a may include any number of banks; for example, one, two, four, eight, sixteen, or thirty two banks, or any number therebetween one and thirty two.

The address register 220 may receive the address ADDR including a bank address BANK_ADDR, a row address ROW_ADDR, and a column address COL_ADDR from the memory controller 100. The address register 220 may provide the received bank address BANK_ADDR to the bank control logic circuit 230, may provide the received row address ROW_ADDR to the row address multiplexer 240, and may provide the received column address COL_ADDR to the column address latch 250.

The bank control logic circuit 230 may generate bank control signals in response to the bank address BANK_ADDR. One of the first to eighth bank row decoders 260a to 260h corresponding to the bank address BANK_ADDR may be activated in response to the bank control signals, and one of the first to eighth bank column decoders 270a to 270h corresponding to the bank address BANK_ADDR may be activated in response to the bank control signals.

The row address multiplexer 240 may receive the row address ROW_ADDR from the address register 220, and may receive a refresh row address REF_ADDR from the refresh counter 245. The row address multiplexer 240 may selectively output the row address ROW_ADDR or the refresh row address REF_ADDR as a row address RA. The row address RA that is output from the row address multiplexer 240 may be applied to the first to eighth bank row decoders 260a to 260h.

The activated one of the first to eighth bank row decoders 260a to 260h may decode the row address RA that is output from the row address multiplexer 240, and may activate in the corresponding bank array a wordline WL corresponding to the row address RA. For example, the activated bank row decoder may generate a wordline driving voltage, and may apply the wordline driving voltage to the wordline WL corresponding to the row address RA.

The column address latch 250 may receive the column address COL_ADDR from the address register 220, and may temporarily store the received column address COL_ADDR. In some example embodiments, in a burst mode, the column address latch 250 may generate column addresses that increment from the received column address COL_ADDR. The column address latch 250 may apply the temporarily stored or generated column address to the first to eighth bank column decoders 270a to 270h.

The activated one of the first to eighth bank column decoders 270a to 270h may decode the column address COL_ADDR that is output from the column address latch 250, and may control the I/O gating circuit 290 to output data corresponding to the column address COL_ADDR.

The I/O gating circuit 290 may include circuitry configured to gate input/output data. The I/O gating circuit 290 may further include read data latches configured to store data that is output from the first to eighth bank arrays 310 to 380, and may also include write control devices for writing data to the first to eighth bank arrays 310 to 380.

A codeword CW read from one of the first to eighth bank arrays 310 to 380 may be sensed by a sense amplifier 285 connected to the one bank array from which the codeword CW is to be read, and may be stored in the read data latches. The codeword CW stored in the read data latches may be provided to the memory controller 100 via the data I/O buffer 295 after the on-die ECC engine 400a performs an ECC decoding on the codeword CW. The codeword CW may be provided to the memory controller 100 as data set (or user data or main data) DQ_BL.

The data set DQ_BL to be written in one of the first to eighth bank arrays 310 to 380 may be provided to the data I/O buffer 295 from the memory controller 100, and may be provided to the on-die ECC engine 400a from the data I/O buffer 295. The on-die ECC engine 400a may perform an ECC encoding on the data set DQ_BL to generate parity data, the on-die ECC engine 400a may provide the codeword CW including the data set DQ_BL and the parity data to the I/O gating circuit 290, and the I/O gating circuit 290 may write the codeword CW in a sub-page of a target page in one bank array through the write drivers.

The data I/O buffer 295 may provide the data set DQ_BL from the memory controller 100 to the on-die ECC engine 400a in a write operation of the data chip 200a, and may provide the data set DQ_BL from the on-die ECC engine 400a to the memory controller 100 in a read operation of the data chip 200a.

The on-die ECC engine 400a may provide an error generation signal EGS to the control logic circuit 210 when the ECC decoding is performed and at least one error bit is detected. In addition, the on-die ECC engine 400a may generate the decoding status flag DSF including information associated with the uncorrectable error or errors that are uncorrectable by the on-die ECC engine 400a, and the correctable error or errors that are correctable by the on-die ECC engine 400a.

The control logic circuit 210 may control operations of the data chip 200a. For example, the control logic circuit 210 may generate control signals for the data chip 200a to perform the write operation and/or the read operation. The control logic circuit 210 may include a command decoder 211 that decodes the command CMD received from the memory controller 100, and a mode register 212 that sets an operation mode of the data chip 200a. In some example embodiments, operations described herein as being performed by the control logic circuit 210 may be performed by processing circuitry.

For example, the command decoder 211 may generate the control signals corresponding to the command CMD by decoding a write enable signal, a row address strobe signal, a column address strobe signal, a chip select signal, etc. For example, the control logic circuit 210 may generate a first control signal CTL1 that controls the I/O gating circuit 290, and a second control signal CTL2 that controls the on-die ECC engine 400a.

The parity chip 200p may have the same or substantially the same configuration as the data chip 200a. The parity chip 200p may input/output a corresponding parity data.

Figure 11:
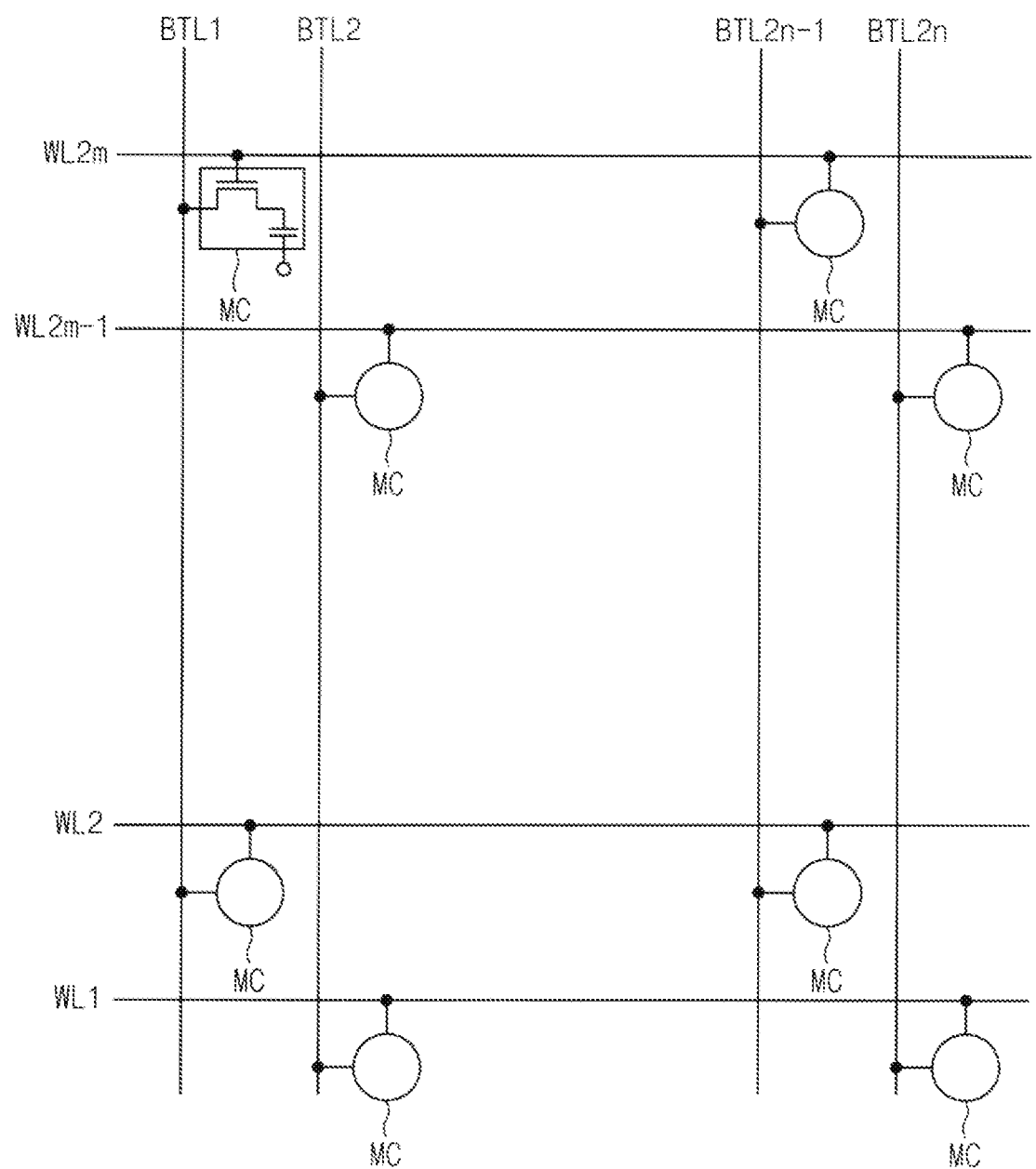
FIG. 11 is a diagram illustrating an example of a bank array included in a data chip of FIG. 10.

FIG. 11 is a diagram illustrating an example of a bank array included in a data chip of FIG. 10.

Referring to FIG. 11, a first bank array 310 may include a plurality of wordlines WL1, WL2, . . . , WL2m–1, WL2m (where m is a natural number greater than or equal to two), a plurality of bitlines BTL1, BTL2, . . . , BTL2n–1, BTL2n (where n is a natural number greater than or equal to two that may or may not be the same as m), and a plurality of memory cells MC arranged at or near intersections between the wordlines WL1 to WL2m and the bitlines BTL1 to BTL2n. For example, each of the plurality of memory cells MC may include a DRAM cell structure. The plurality of wordlines WL1 to WL2m to which the plurality of memory cells MC are connected may be referred to as rows of the first bank array 310, and the plurality of bitlines BTL1 to BTL2n to which the plurality of memory cells MC are connected may be referred to as columns of the first bank array 310.

Figure 12:
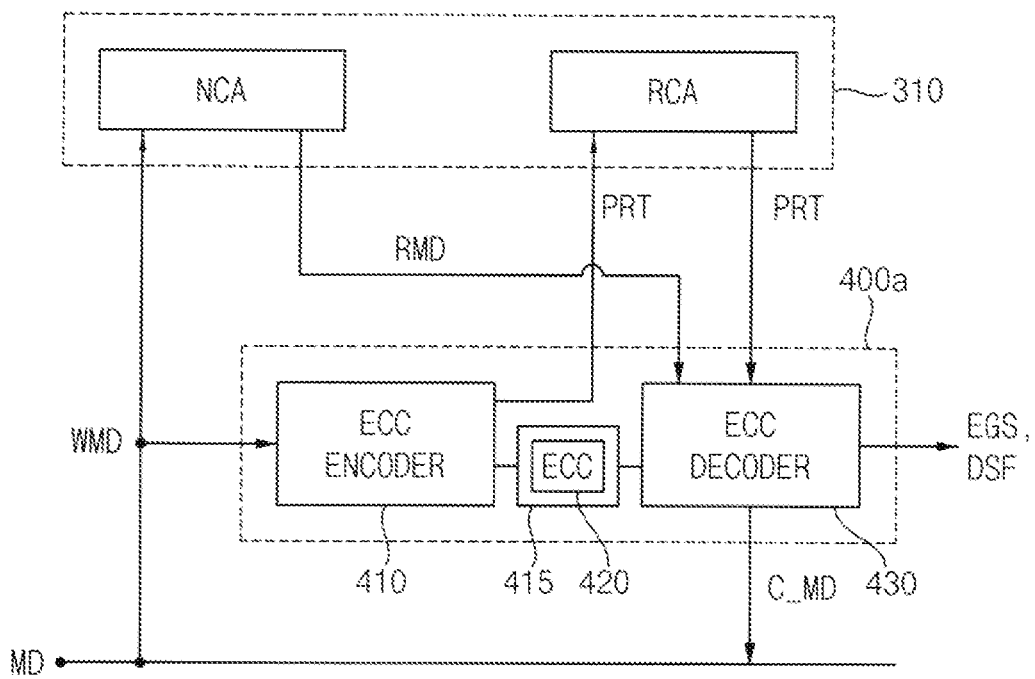
FIG. 12 is a block diagram illustrating an example of an on-die ECC engine included in a memory module included in a memory system according to some example embodiments.

FIG. 12 is a block diagram illustrating an example of an on-die ECC engine included in a memory module included in a memory system according to some example embodiments.

Referring to FIG. 12, an on-die ECC engine 400a may include an ECC encoder 410, a memory 415, and an ECC decoder 430.

The memory 415 may store an ECC 420. For example, the ECC 420 may be a single error correction (SEC) code, or may be a single error correction/double error detection (SECDED) code. However, example embodiments and the present disclosure are not limited thereto.

Using the ECC 420, the ECC encoder 410 may generate parity data PRT associated with write data WMD to be stored in a normal cell array NCA of the first bank array 310. The parity data PRT may be stored in a redundancy cell array RCA of the first bank array 310.

Using the ECC 420, the ECC decoder 430 may perform an ECC decoding on read data RMD based on the read data RMD and the parity data PRT read respectively from the normal cell array NCA and redundant cell array RCA of the first bank array 310. When the read data RMD includes at least one error bit as a result of the ECC decoding, the ECC decoder 430 may provide the error generation signal EGS to the control logic circuit 210, may generate the decoding status flag DSF and provide the decoding status flag DSF to the memory controller 100, and may correct the error bit in the read data RMD and output corrected main data C_MD in a read operation.

Figure 13:
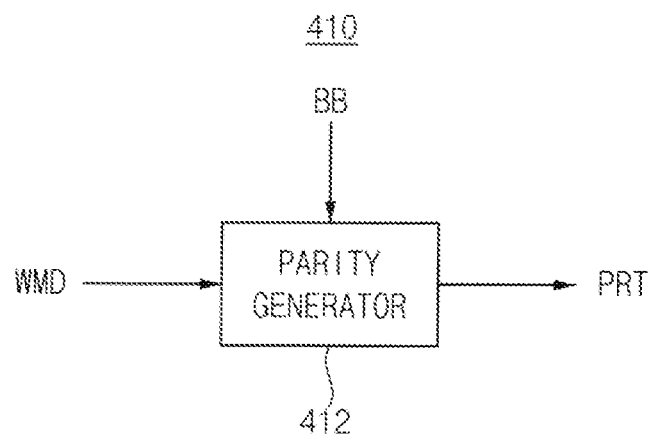
FIG. 13 is a block diagram illustrating an example of an ECC encoder included in an on-die ECC engine of FIG. 12.

FIG. 13 is a block diagram illustrating an example of an ECC encoder included in an on-die ECC engine of FIG. 12.

Referring to FIG. 13, an ECC encoder 410 may include a parity generator 412. The parity generator 412 may receive the write data WMD and basis bits BB, and may generate the parity data PRT by performing, for example, an XOR array operation.

Figure 14:
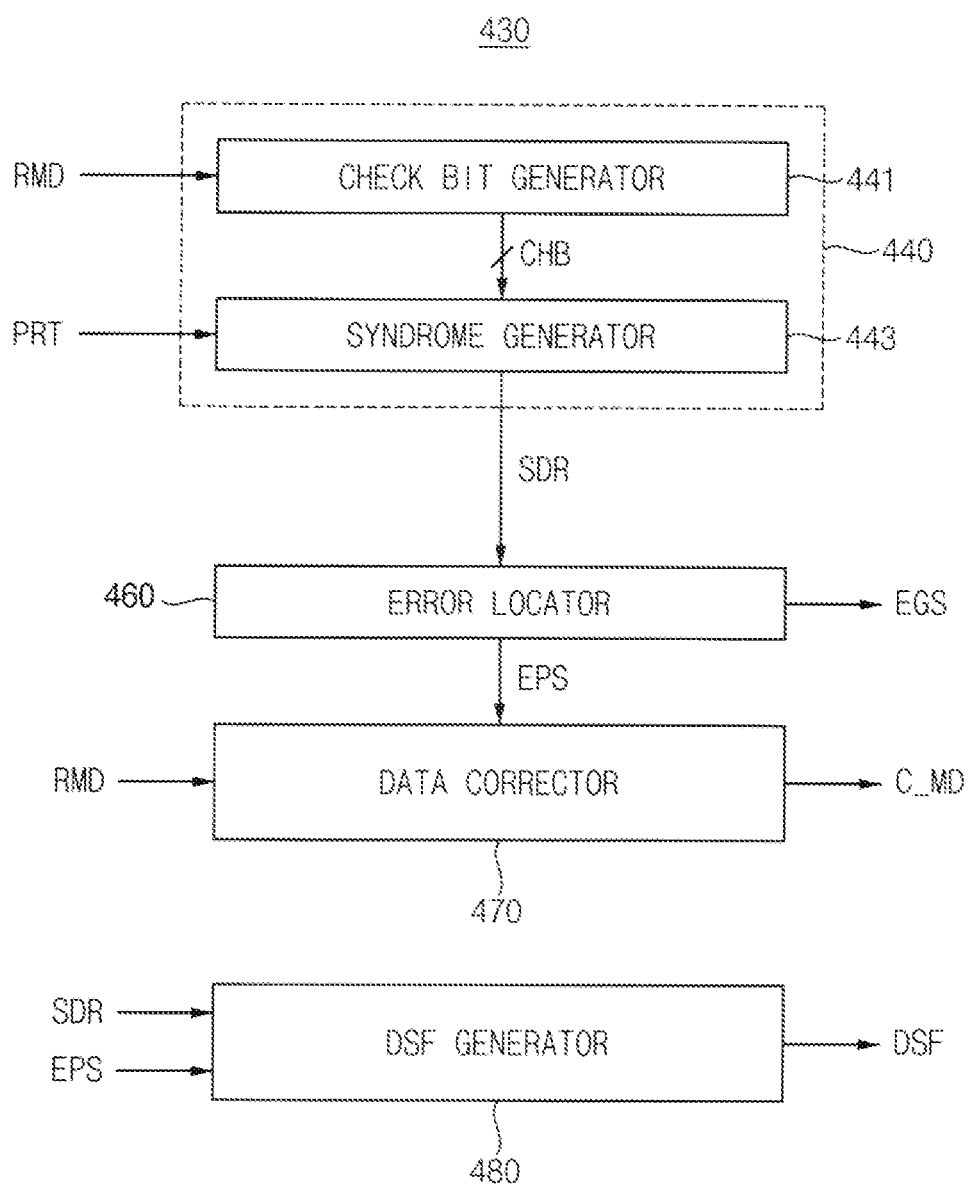
FIG. 14 is a block diagram illustrating an example of an ECC decoder included in an on-die ECC engine of FIG. 12.

FIG. 14 is a block diagram illustrating an example of an ECC decoder included in an on-die ECC engine of FIG. 12.

Referring to FIG. 14, an ECC decoder 430 may include a syndrome generation circuit 440, an error locator 460, a data corrector 470, and a decoding status flag generator 480. The syndrome generation circuit 440 may include a check bit generator 441 and a syndrome generator 443.

The syndrome generation circuit 440 may generate a syndrome SDR based on the read data RMD and the parity data PRT. The check bit generator 441 may generate check bits CHB based on the read data RMD by performing, an XOR array operation. The syndrome generator 443 may generate the syndrome SDR by comparing corresponding bits of the parity data PRT and the check bits CHB.

When all bits of the syndrome SDR are non-zero, the error locator 460 may generate an error position signal EPS representing a position of an error bit in the read data RMD, and may provide the error position signal EPS to the data corrector 470. In addition, when the read data RMD includes the error bit, the error locator 460 may generate the error generation signal EGS, and may provide the error generation signal EGS to the control logic circuit 210.

The data corrector 470 may receive the read data RMD, may correct the error bit in the read data RMD based on the error position signal EPS when the read data RMD includes the error bit, and may generate and output the corrected main data C_MD.

The decoding status flag generator 480 may generate the decoding status flag DSF that represents a state of the error bit in the read data RMD based on the syndrome SDR and the error position signal EPS. For example, the decoding status flag DSF may represent that the read data RMD does not include any error (e.g., no error; NE), may represent that the read data RMD includes an error that cannot be corrected by the on-die ECC engine 400a (e.g., uncorrectable error; UE), or may represent that the read data RMD includes an error that can be corrected by the on-die ECC engine 400a (e.g., correctable error; CE).

Figure 15:
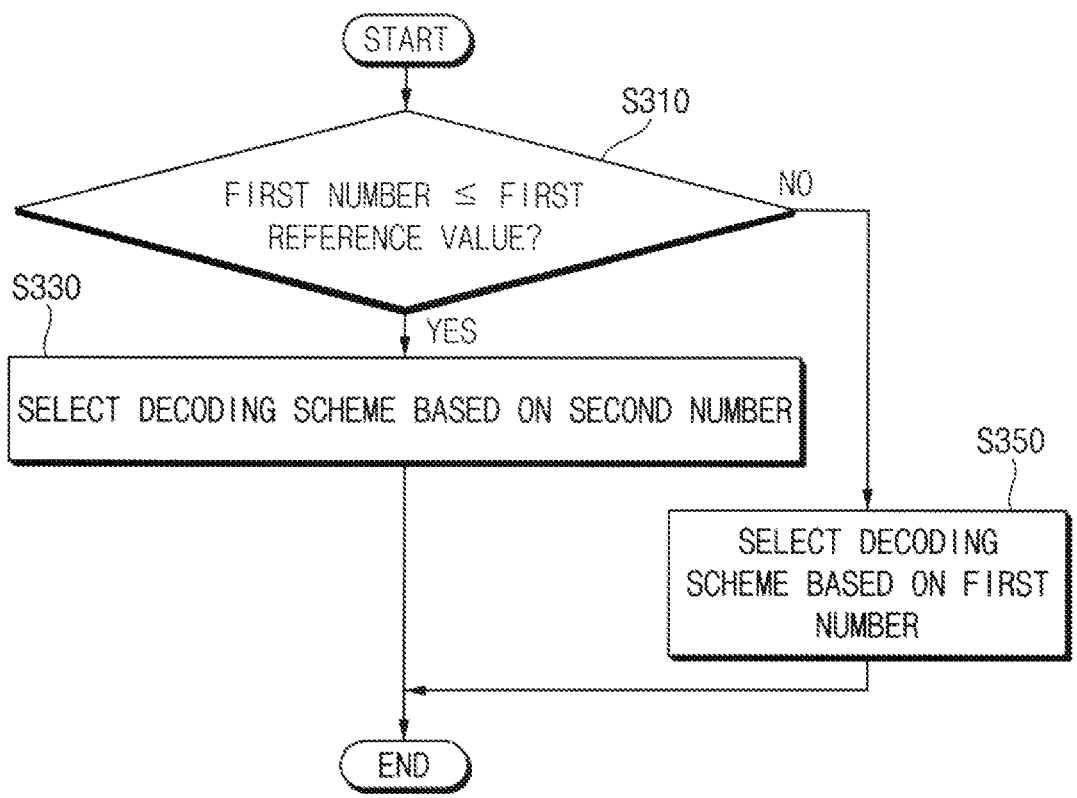
FIG. 15 is a flowchart illustrating an example of selecting at least one of a plurality of decoding schemes in FIG. 1.

FIG. 15 is a flowchart illustrating an example of selecting at least one of a plurality of decoding schemes discussed herein, e.g., with reference to FIG. 1.

Referring to FIGS. 1 and 15, in step S300 of FIG. 1, when the first number of the first chips including the uncorrectable errors that are uncorrectable by the on-die ECC engine is less than or equal to a first reference value (step S310: YES), the at least one of the plurality of decoding schemes may be selected based on the second number of the second chips including the correctable errors that are correctable by the on-die ECC engine (step S330). When the first number is greater than the first reference value (step S310: NO), the at least one of the plurality of decoding schemes may be selected based on the first number (step S350).

In some example embodiments, the first reference value may be zero. For example, step S330 may be performed when the first number is zero, and step S350 may be performed when the first number is one or more.

Figure 16:
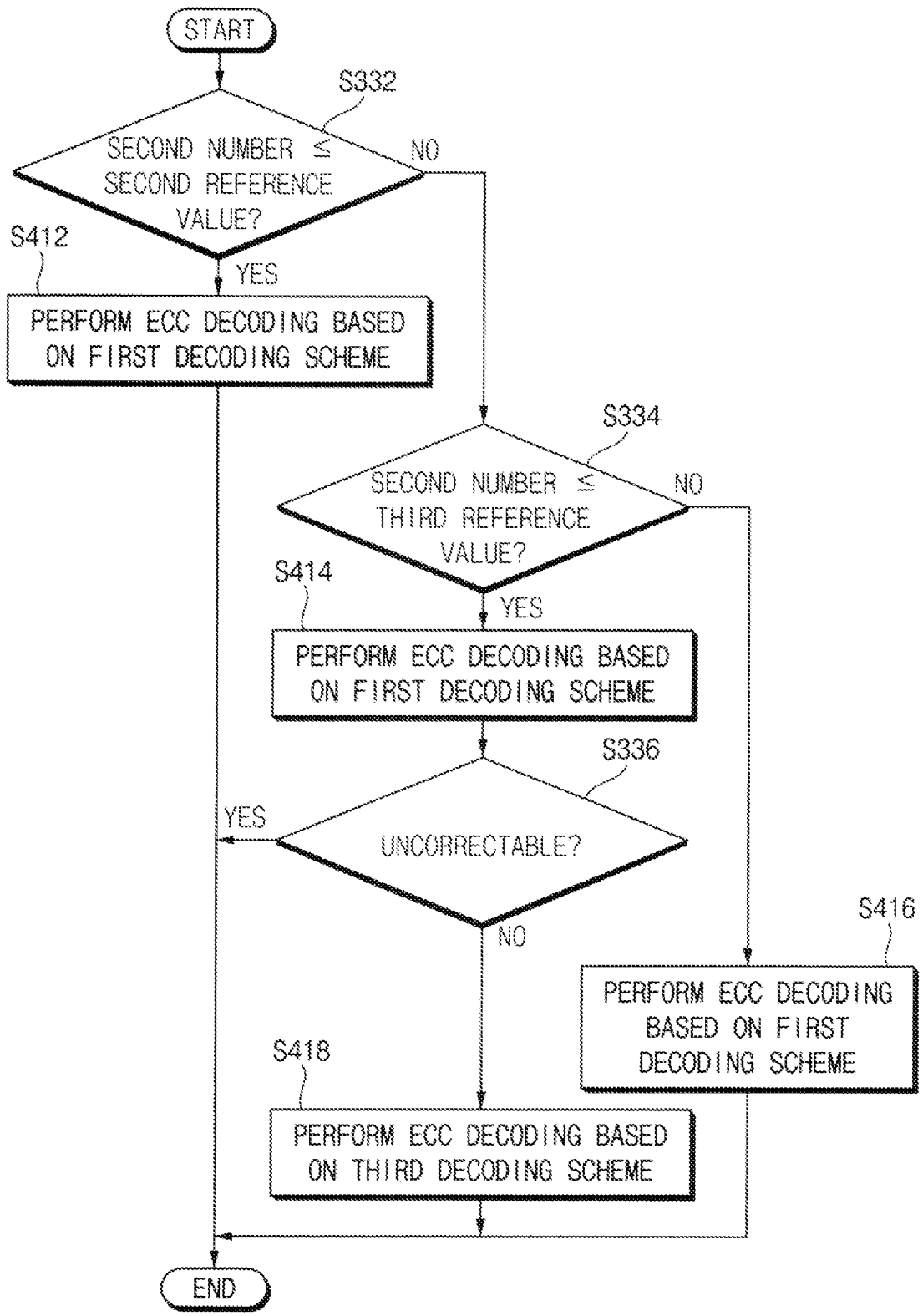
FIGS. 16 and 17 are flowcharts illustrating an example of selecting at least one of a plurality of decoding schemes and an example of performing an ECC decoding in FIG. 1.
Figure 17:
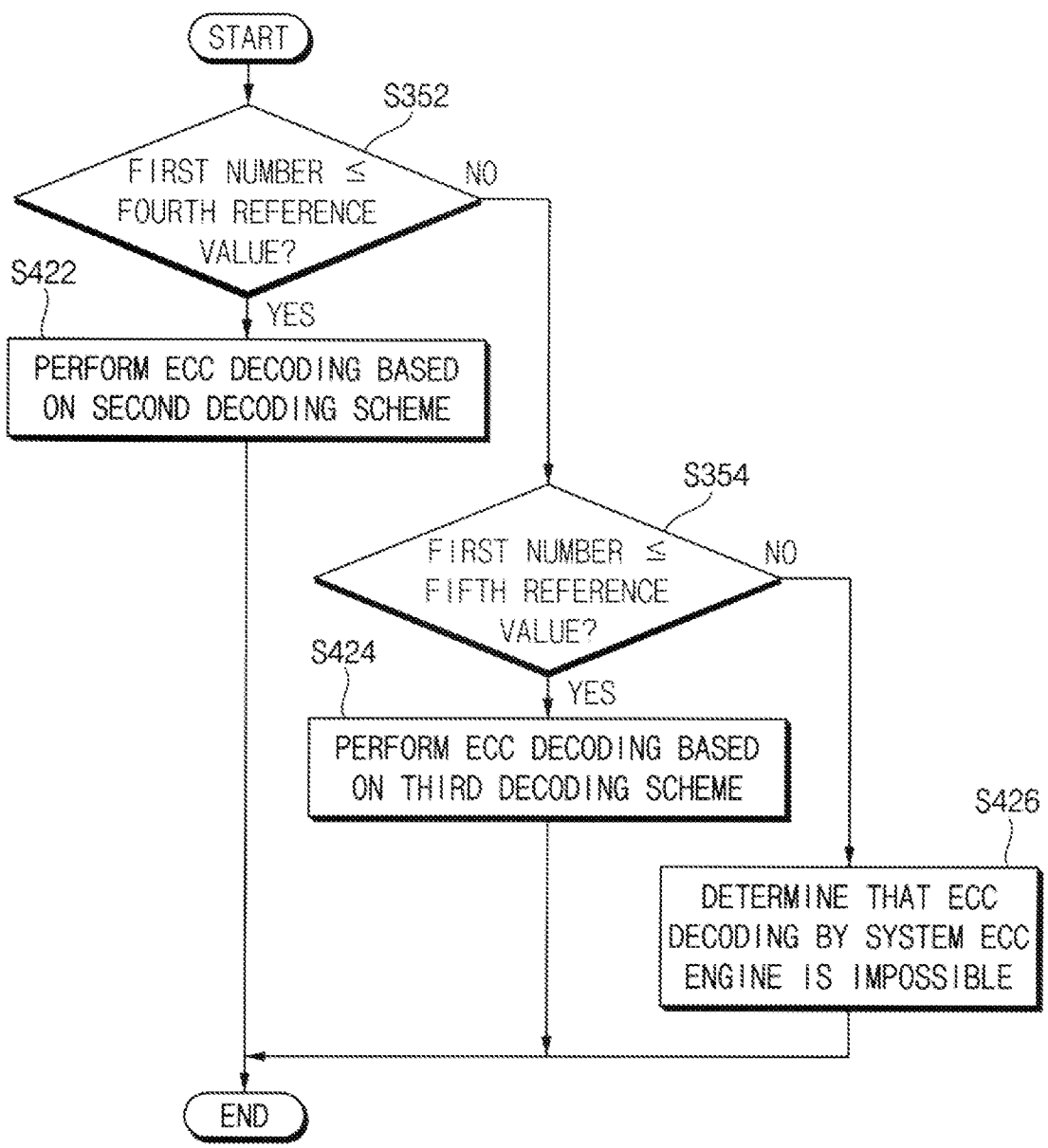

FIGS. 16 and 17 are flowcharts illustrating an example of selecting at least one of a plurality of decoding schemes and an example of performing an ECC decoding in FIG. 1.

Referring to FIGS. 1, 15 and 16, in step S330 of FIG. 15, the decoding scheme may be selected by comparing the second number with a second reference value and a third reference value. In step S400 of FIG. 1, the ECC decoding may be performed based on the selected decoding scheme.

For example, when the second number is less than or equal to the second reference value (step S332: YES), a first decoding scheme may be selected, and the system ECC engine may perform the ECC decoding on the second chips based on the first decoding scheme (step S412).

When the second number is greater than the second reference value (step S332: NO), and when the second number is less than or equal to the third reference value (step S334: YES), the first decoding scheme may be selected, and the system ECC engine may perform the ECC decoding on the second chips based on the first decoding scheme (step S414).

When the second number is greater than the third reference value (step S334: NO), the first decoding scheme may be selected, and the system ECC engine may perform the ECC decoding on the second chips based on the first decoding scheme (step S416).

In some example embodiments, when the ECC decoding is failed even if steps S334 and S414 are performed, it may be determined that an additional correction is possible as in "NO" in step S336, a third decoding scheme different from the first decoding scheme may be additionally selected even at the risk of the occurrence of a final error, and the system ECC engine may additionally perform the ECC decoding on the second chips based on the third decoding scheme (step S418). In other example embodiments, when the ECC decoding is failed even if steps S334 and S414 are performed, it may be determined that the ECC decoding by the system ECC engine is uncorrectable or not possible as in "YES" in step S336, and the process may be terminated with declaring the ECC decoding not possible.

Referring to FIGS. 1, 15 and 17, in step S350 of FIG. 15, the decoding scheme may be selected by comparing the first number with a fourth reference value and a fifth reference value. In step S400 of FIG. 1, the ECC decoding may be performed based on the selected decoding scheme.

For example, when the first number is greater than the first reference value (step S310: NO), and when the first number is less than or equal to the fourth reference value (step S352: YES), a second decoding scheme different from the first decoding scheme may be selected, and the system ECC engine may perform the ECC decoding on the first chips based on the second decoding scheme (step S422).

When the first number is greater than the fourth reference value (step S335: NO), and when the first number is less than or equal to the fifth reference value (step S354: YES), the third decoding scheme different from the first and second decoding schemes may be selected, and the system ECC engine may perform the ECC decoding on the first chips based on the third decoding scheme (step S424).

When the first number is greater than the fifth reference value (step S354: NO), it may be determined that the ECC decoding by the system ECC engine is impossible (step S426), and the process may be terminated with declaring the ECC decoding impossible.

FIGS. 18, 19A, 19B, 19C, 19D, 19E, 19F and 19G are diagrams for describing operations of FIGS. 16 and 17.

Referring to FIGS. 18, 19A, 19B, 19C, 19D, 19E, 19F and 19G, detailed examples based on FIGS. 16 and 17 are illustrated when the second reference value is one, the third reference value is two, the fourth reference value is one, and the fifth reference value is two. In FIGS. 19A, 19B, 19C, 19D, 19E, 19F and 19G, the memory module may include sixteen data chips C0, C1, C2, C3, . . . , C14, C15 that input and output data sets DQ_BL1, DQ_BL2, DQ_BL3, DQ_BL4, DQ_BL15, DQ_BL16, and two parity chips CLP and CMP that input and output parity data PRTL and PRTM, and each memory chip may be connected to four data I/O pins. In other words, examples where N=16 in FIG. 4A are illustrated in FIGS. 19A, 19B, 19C, 19D, 19E, 19F and 19G. "CE" and "UE" represent the correctable errors that are correctable by the on-die ECC engine and the uncorrectable errors that are uncorrectable by the on-die ECC engine, respectively.

Figure 19B:
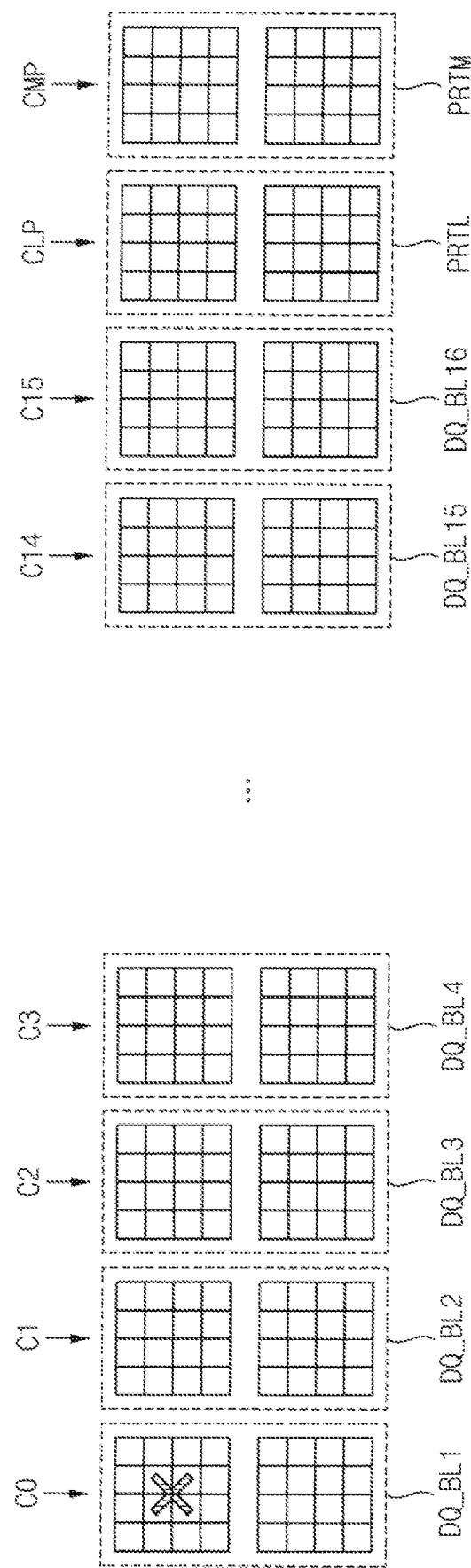

In an example of CASE11, e.g., when the number of chips including uncorrectable errors is zero and the number of chips including correctable errors is zero or one as illustrated in FIGS. 19A and 19B, "NE" (e.g., no error) may have the possibility of un-detection, and "CE" may have the possibility of mis-correction, and thus the system ECC engine may perform the ECC decoding on the data chip C0 using a first decoding scheme CPK_x4 as in step S412.

In an example of CASE21, e.g., when the number of chips including uncorrectable errors is zero and the number of chips including correctable errors is two as illustrated in FIG. 19C, the system ECC engine may perform the ECC decoding on at least one of the data chips C0 and C1 using the first decoding scheme CPK_x4 as in step S414, and may selectively/additionally perform the ECC decoding on at least one of the data chips C0 and C1 using a third decoding scheme 2CED_x4 as in step S418.

Figure 19D:
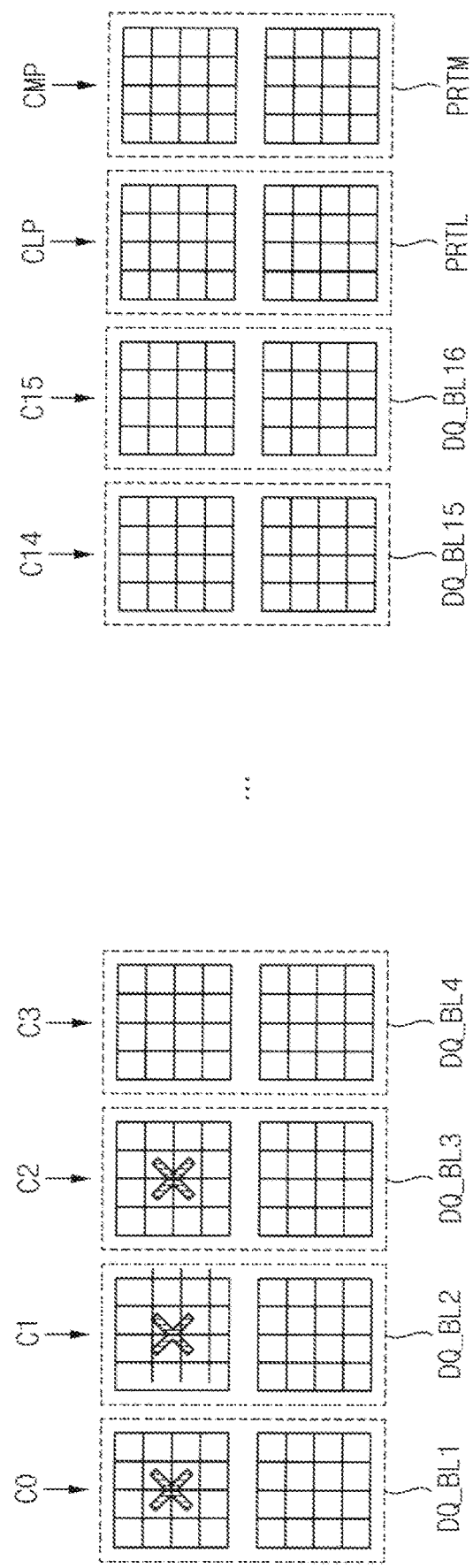

In an example of CASE31, e.g., when the number of chips including uncorrectable errors is zero and the number of chips including correctable errors is three or more as illustrated in FIG. 19D, the system ECC engine may perform the ECC decoding on at least one of the data chips C0, C1 and C2 using the first decoding scheme CPK_x4 as in step S416.

Figure 19E:
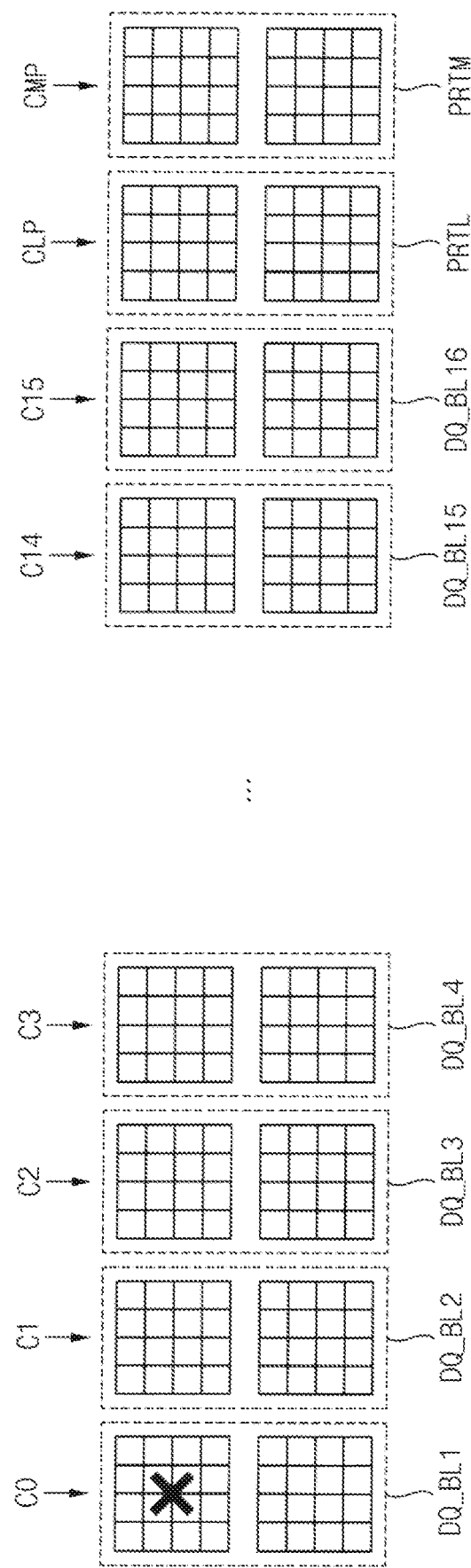

In an example of CASE41, e.g., when the number of chips including uncorrectable errors is one as illustrated in FIG. 19E, "UE" may be information more accurate than "NE" and "CE", and thus the system ECC engine may perform the ECC decoding on the data chip C0 using a second decoding scheme 1CED_x4 as in step S422.

Figure 19F:
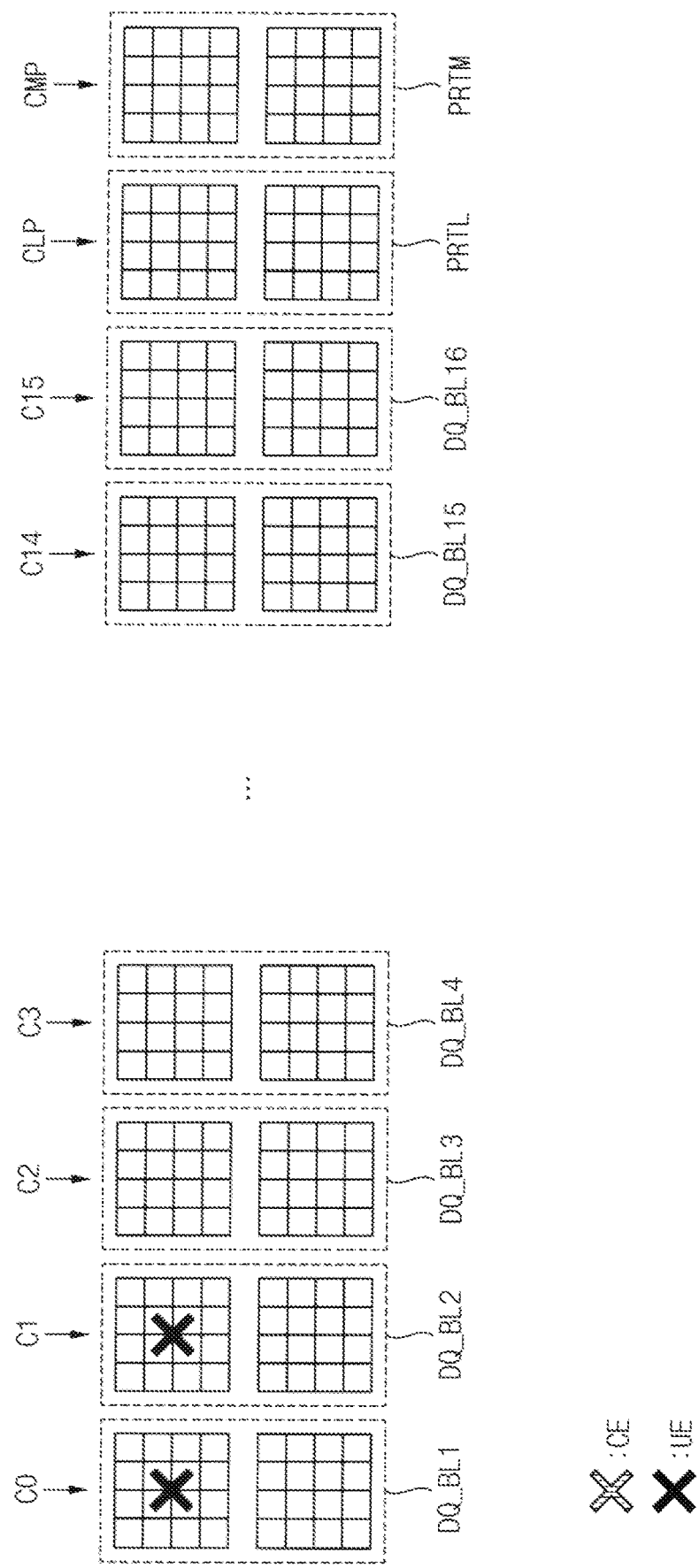

In an example of CASE51, e.g., when the number of chips including uncorrectable errors is two as illustrated in FIG. 19F, the system ECC engine may perform the ECC decoding on at least one of the data chips C0 and C1 using the third decoding scheme 2CED_x4 as in step S424.

Figure 19G:
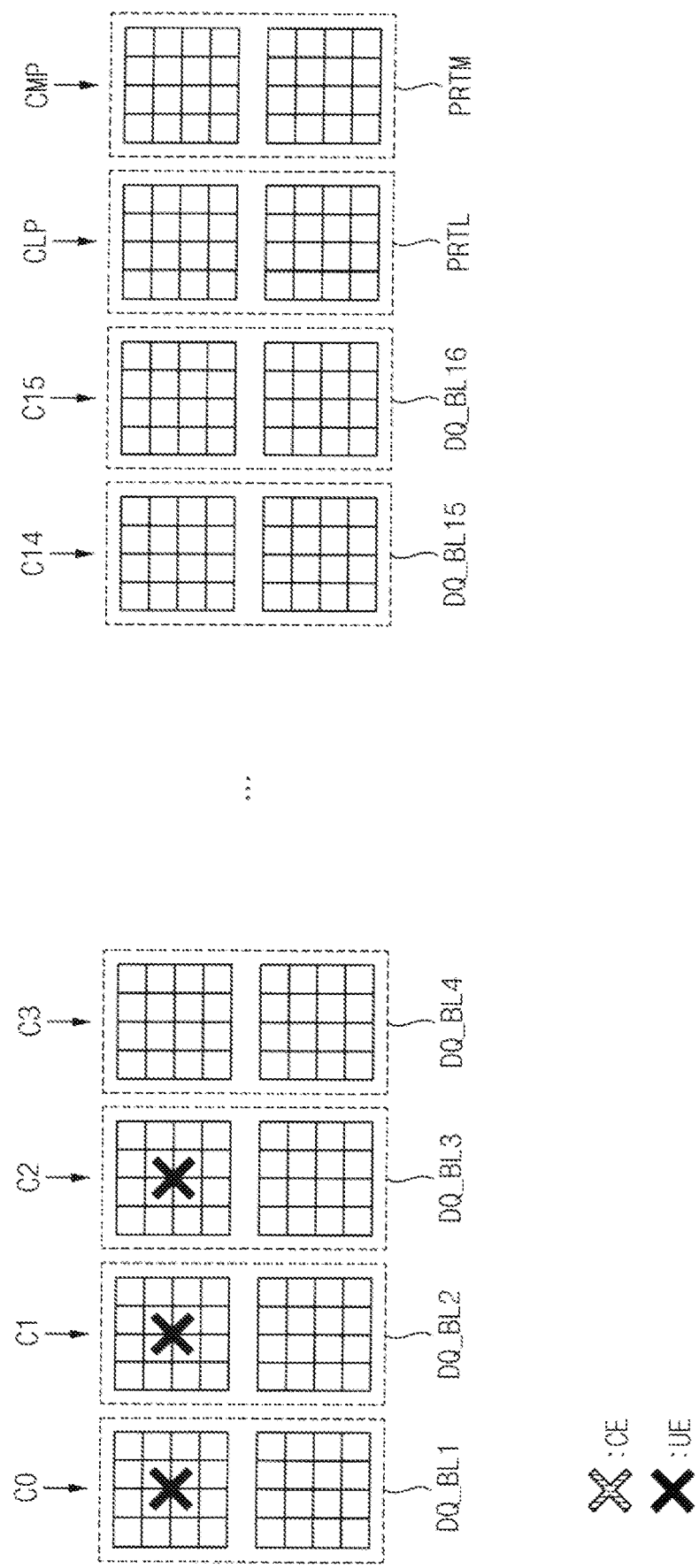

In an example of CASE61, e.g., when the number of chips including uncorrectable errors is three or more as illustrated in FIG. 19G, it may be declared that the ECC decoding by the system ECC engine is not possible (e.g., SECC UE) as in step S426.

In some example embodiments, the first decoding scheme CPK_x4, the second decoding scheme 1CED_x4 and the third decoding scheme 2CED_x4 that are different from each other may represent Chipkill scheme, 1-chip erasure decoding scheme and 2-chip erasure decoding scheme, respectively. The first decoding scheme CPK_x4 may be performed on one data chip, the second decoding scheme 1CED_x4 may be performed on one data chip, and the third decoding scheme 2CED_x4 may be performed on two data chips.

Chipkill is a technique of advanced error checking and correcting (ECC) computer memory technology that protects computer memory systems from any single memory chip failure as well as multi-bit errors from any portion of a single memory chip. One relatively simple scheme to perform this function may scatter the bits of a Hamming code ECC word across multiple memory chips, such that the failure of any single memory chip will affect only one ECC bit per word. This allows memory contents to be reconstructed despite the complete failure of one chip. Typical implementations use more advanced codes, such as a Bose-Chaudhuri-Hocquenghem (BCH) code, that can correct multiple bits with less overhead.

In coding theory, an erasure decoding (or coding) is a technique of using a forward error correction (FEC) code under the assumption of bit erasures (rather than bit errors), which transforms a message of k symbols into a longer message (codeword) with n symbols such that the original message can be recovered from a subset of the n symbols. The fraction r=k/n is called the code rate. The fraction k'/k, where k' denotes the number of symbols required for recovery, is called reception efficiency.

In some example embodiments, the second decoding scheme 1CED_x4 may be performed to correct an error for only one specific memory chip by adding an error magnitude syndrome (e.g., the second syndrome SDR_M in FIG. 9), and then by re-calculating an error locator syndrome (e.g., the first syndrome SDR_L in FIG. 9).

In some example embodiments, the third decoding scheme 2CED_x4 may be performed to correct an error for two specific memory chips using a syndrome and a position of an error. For example, the ECC encoding may be performed on the data chips C0 and C1 using the third decoding scheme 2CED_x4 by calculating a solution of a 2*2 linear system based on Equation 1 in steps S418 and S424.

$$\begin{bmatrix} 1 & 1 \\ \alpha^1 & \alpha^2 \end{bmatrix} \begin{bmatrix} E_0 \\ E_1 \end{bmatrix} = \begin{bmatrix} S_0 \\ S_1 \end{bmatrix} \qquad \text{[Equation 1]}$$

In some example embodiments, it may be checked that the syndrome is non-zero, a condition of the decoding status flag DSF may be checked to identify the number of uncorrectable errors and/or correctable errors, a suitable decoding scheme may be selected based on a result of the checks, and thus steps S412, S414, S418, S422 and S424 may be performed based on the selected decoding scheme.

In the x4 structure, only one chip error in the memory module may be corrected by a conventional method, however, up to two chip errors in the memory module may be corrected by above-described example embodiments.

Figure 20:
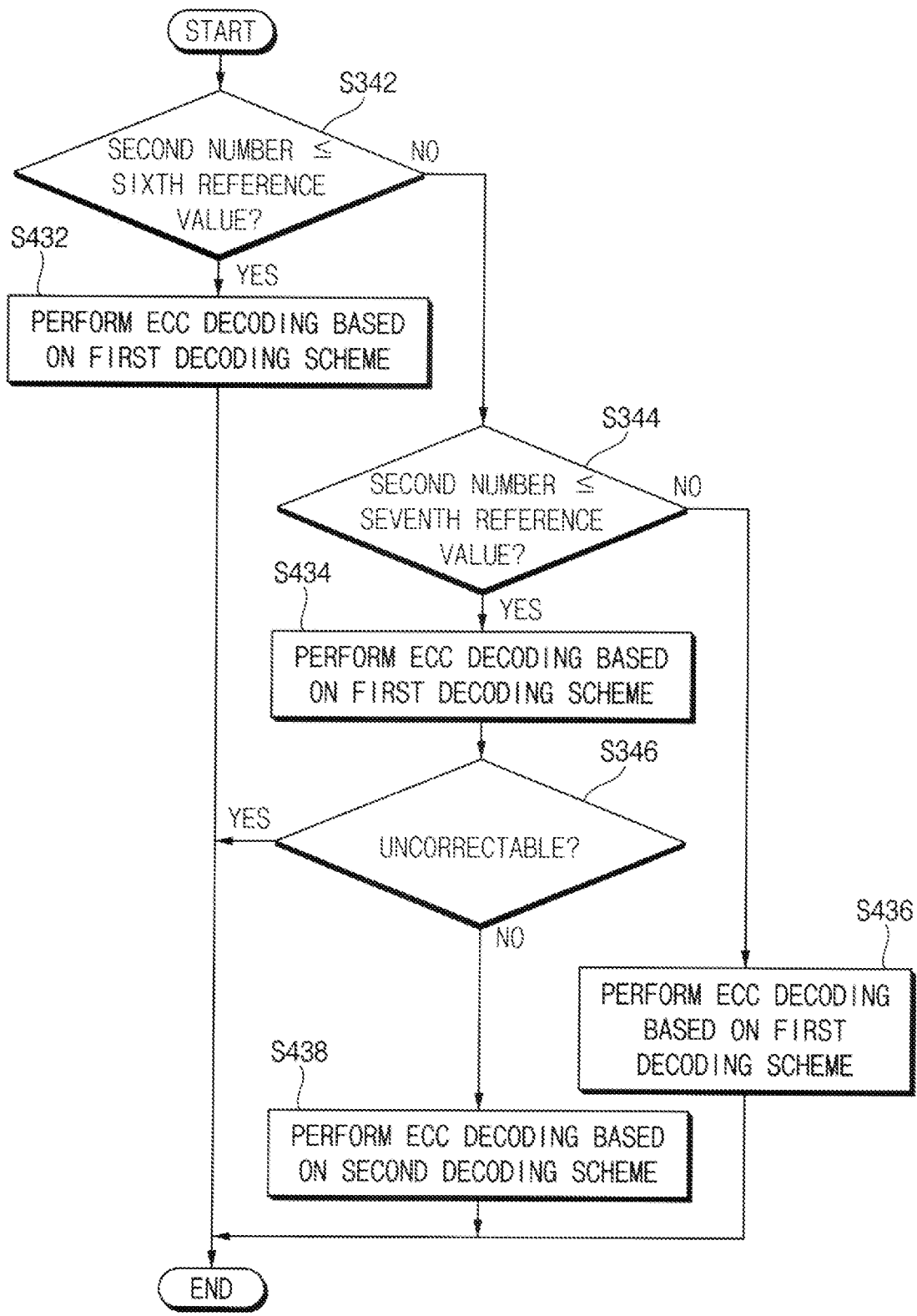
FIGS. 20 and 21 are flowcharts illustrating another example of selecting at least one of a plurality of decoding schemes and an example of performing an ECC decoding in FIG. 1.
Figure 21:
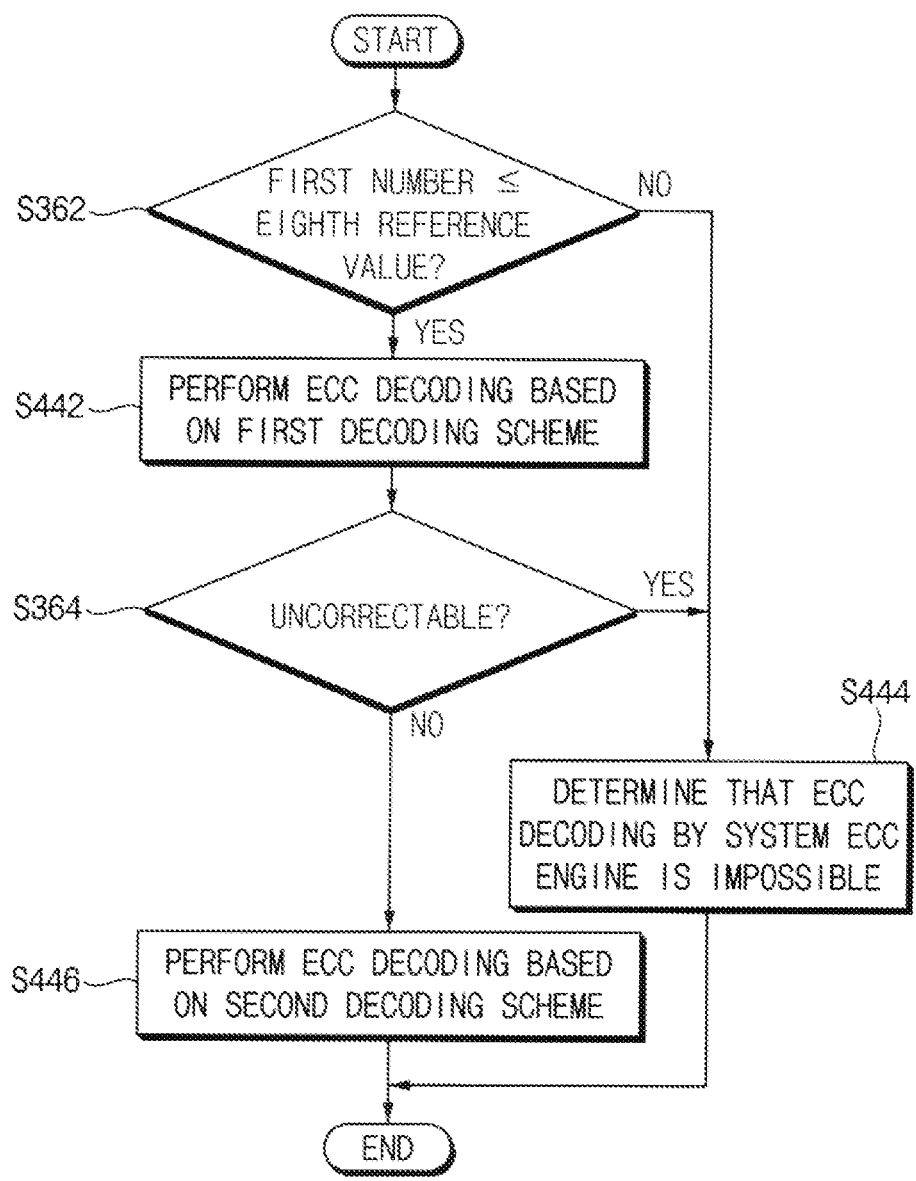

FIGS. 20 and 21 are flowcharts illustrating another example of selecting at least one of a plurality of decoding schemes and an example of performing an ECC decoding in FIG. 1. At least some of the descriptions of FIGS. 20 and 21 that are overlapping with those of FIGS. 16 and 17 will be omitted in the interest of brevity.

Referring to FIGS. 1, 15 and 20, in step S330 of FIG. 15, the decoding scheme may be selected by comparing the second number with a sixth reference value and a seventh reference value. In step S400 of FIG. 1, the ECC decoding may be performed based on the selected decoding scheme.

Steps S342, S344, S346, S432, S434, S436 and S438 may be similar to steps S332, S334, S336, S422, S424, S426 and S428 in FIG. 16, respectively.

Referring to FIGS. 1, 15 and 21, in step S350 of FIG. 15, the decoding scheme may be selected by comparing the first number with an eighth reference value. In step S400 of FIG. 1, the ECC decoding may be performed based on the selected decoding scheme.

Steps S362, S442 and S444 may be similar to steps S352, S422 and S426 in FIG. 17, respectively. Steps S364 and S446 may be similar to steps S346 and S438 in FIG. 20, respectively.

FIGS. 22, 23A, 23B, 23C, 23D and 23E are diagrams for describing operations of FIGS. 20 and 21. Some of the descriptions of FIGS. 22 and 23A-E overlapping with those of FIGS. 18, 19A, 19B, 19C, 19D, 19E, 19F and 19G will be omitted in the interest of brevity.

Referring to FIGS. 22, 23A, 23B, 23C, 23D and 23E, detailed examples based on FIGS. 20 and 21 are illustrated when the sixth reference value is zero, the seventh reference value is one, and the eighth reference value is one. In FIGS. 23A, 23B, 23C, 23D and 23E, the memory module may include eight data chips C0', C1', . . . , C7' that input and output data sets DQ_BL1a, DQ_BL1b, DQ_BL2a, DQ_BL2b, DQ_BL8a, . . . , DQ_BL8b, and one parity chip CP that inputs and outputs parity data PRTL and PRTM, and each memory chip may be connected to eight data I/O pins. In other words, examples where M=8 in FIG. 4B are illustrated in FIGS. 23A, 23B, 23C, 23D and 23E.

Figure 23A:
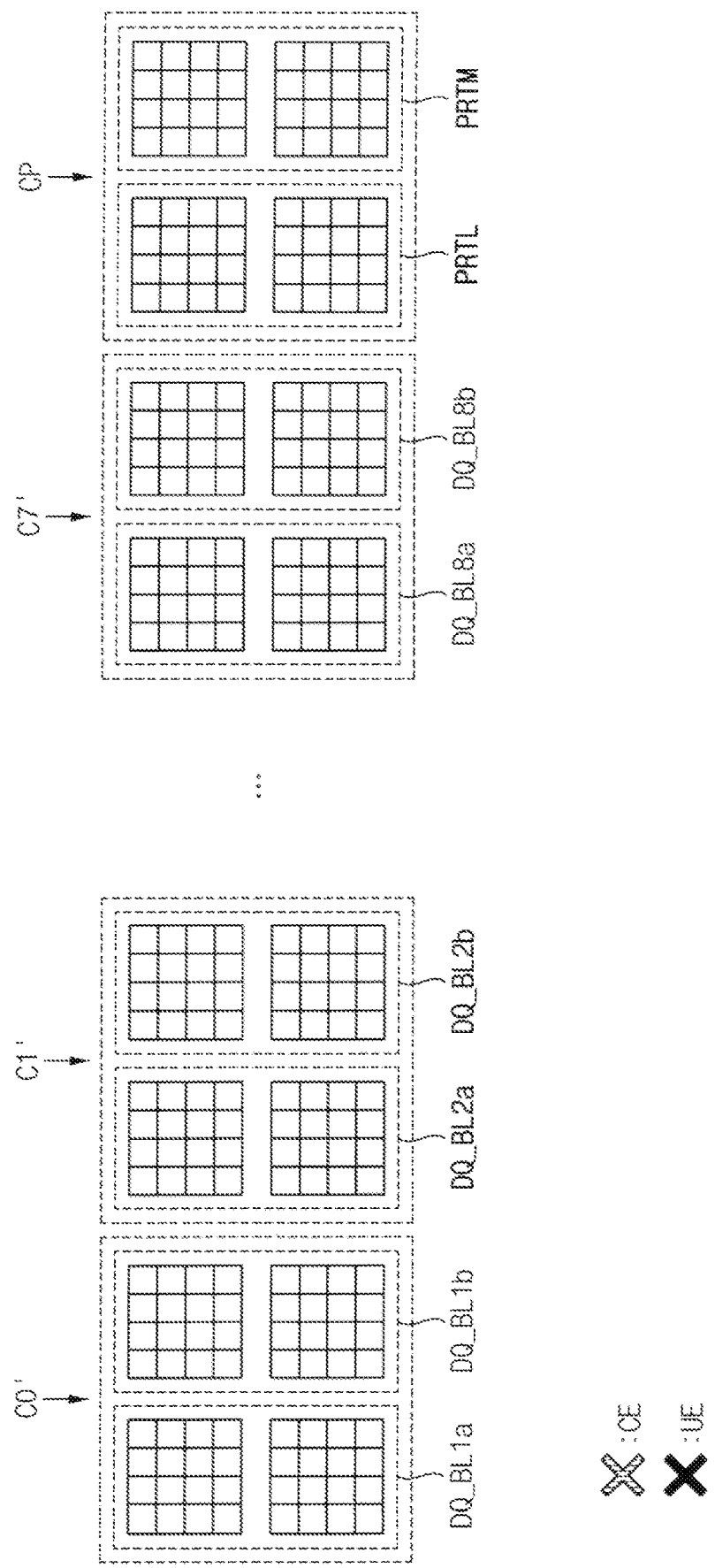

In an example of CASE12, e.g., when the number of chips including uncorrectable errors is zero and the number of chips including correctable errors is zero as illustrated in FIG. 23A, the system ECC engine may perform the ECC decoding using a first decoding scheme HCPK_x8 as in step S432.

Figure 23B:
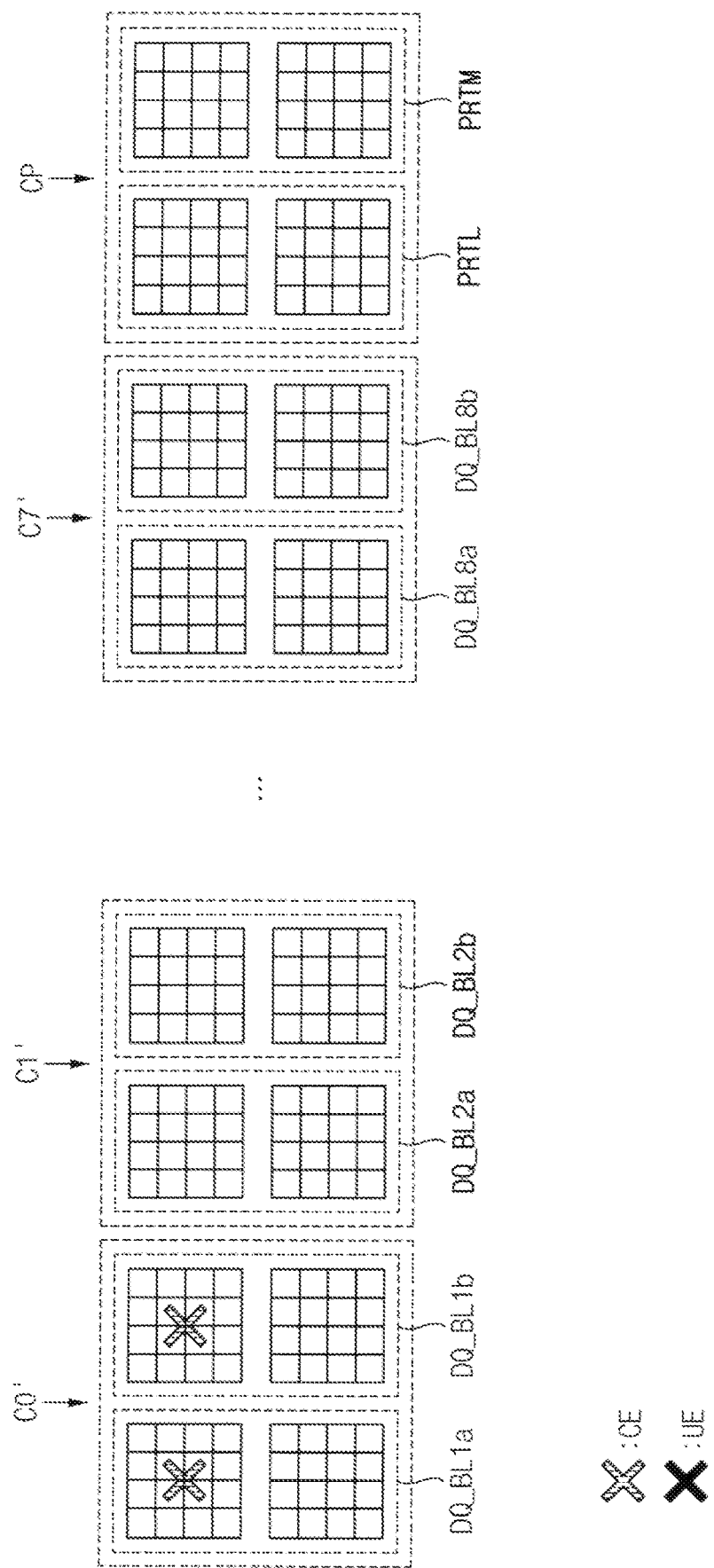

In an example of CASE22, e.g., when the number of chips including uncorrectable errors is zero and the number of chips including correctable errors is one as illustrated in FIG. 23B, the system ECC engine may perform the ECC decoding on the data chip C0' using the first decoding scheme HCPK_x8 as in step S434, and may selectively/additionally perform the ECC decoding on the data chip C0' using a second decoding scheme 1CED_x8 as in step S438.

Figure 23C:
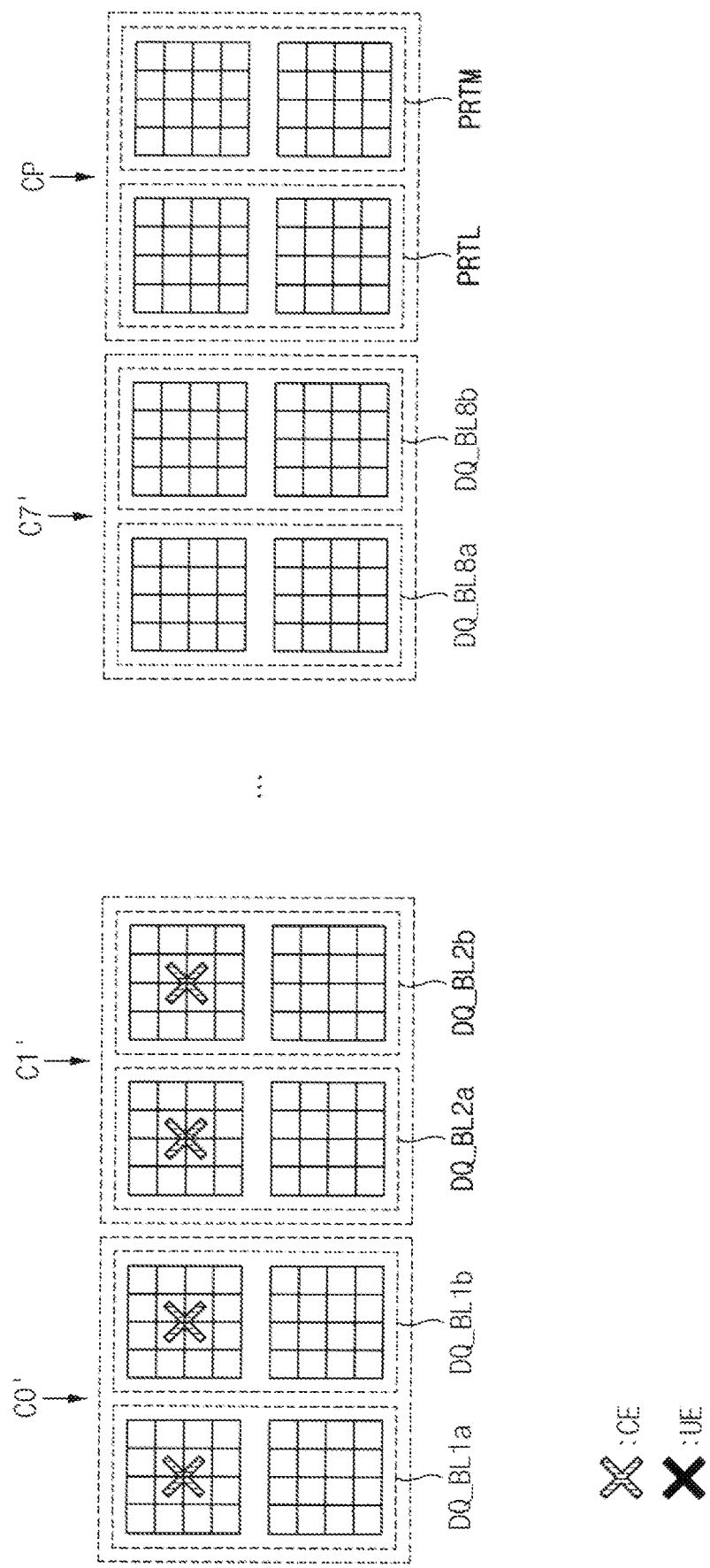

In an example of CASE32, e.g., when the number of chips including uncorrectable errors is zero and the number of chips including correctable errors is two or more as illustrated in FIG. 23C, the system ECC engine may perform the ECC decoding on at least one of the data chips C0' and C1' using the first decoding scheme HCPK_x8 as in step S436.

In an example of CASE42, e.g., when the number of chips including uncorrectable errors is one as illustrated in FIG. 23D, the system ECC engine may perform the ECC decoding on the data chip C0' using the first decoding scheme HCPK_x8 as in step S442, and may selectively/additionally perform the ECC decoding on the data chip C0' using the second decoding scheme 1CED_x8 as in step S446.

Figure 23E:
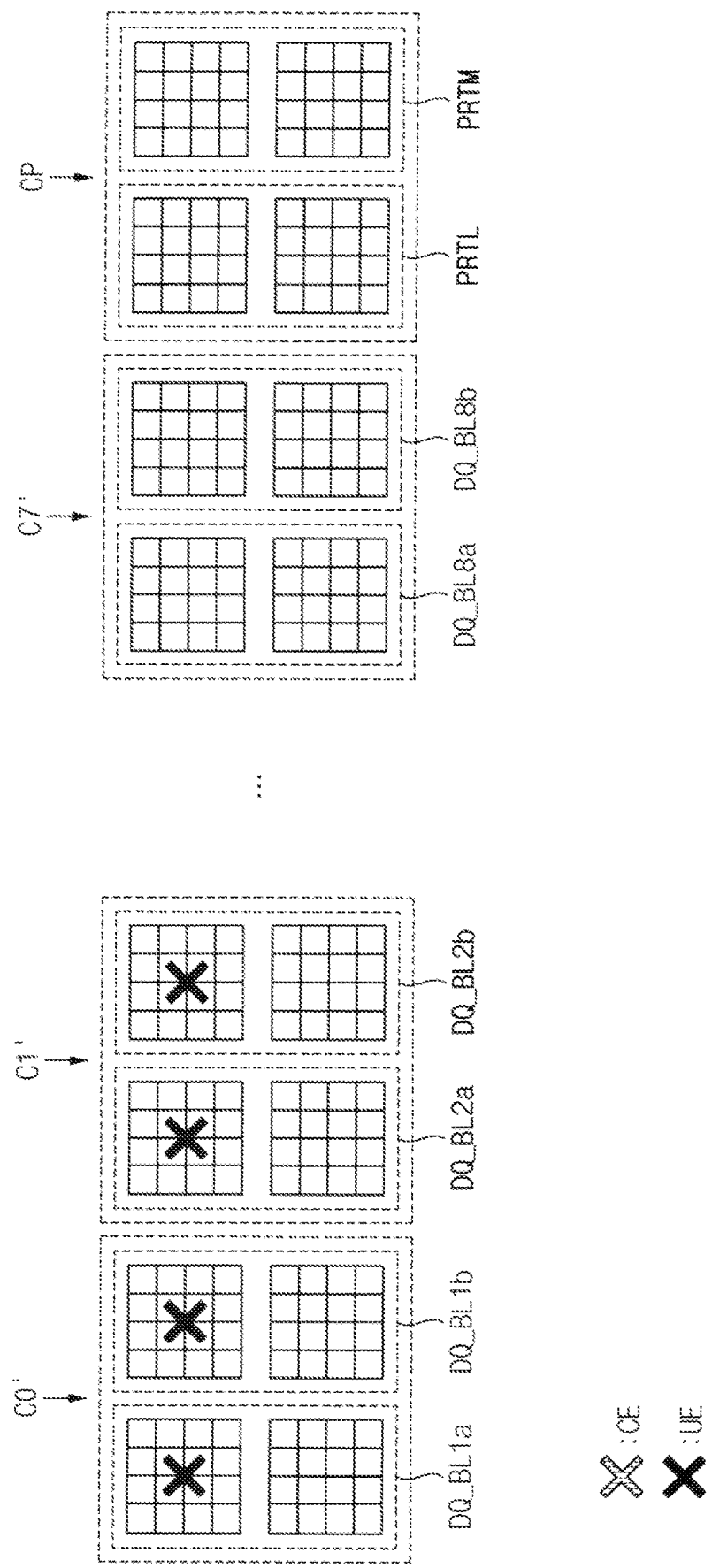

In an example of CASE52, e.g., when the number of chips including uncorrectable errors is two or more as illustrated in FIG. 23E, it may be declared that the ECC decoding by the system ECC engine is not possible (e.g., SECC UE) as in step S444.

In some example embodiments, the first decoding scheme HCPK_x8 and the second decoding scheme 1CED_x8 that are different from each other may represent half-Chipkill scheme and 1-chip erasure decoding scheme, respectively. The first decoding scheme HCPK_x8 may be performed on a partial region (e.g., a half) of one data chip, and the second decoding scheme 1CED_x8 may be performed on the entire region of one data chip. The first decoding scheme HCPK_x8 may be similar to the first decoding scheme CPK_x4 in FIG. 18, and the second decoding scheme 1CED_x8 may be similar to the third decoding scheme 2CED_x4 in FIG. 18.

In the x8 structure, only half chip error in the memory module may be corrected by a conventional method, however, up to one chip error in the memory module may be corrected by above-described example embodiments.

Figure 24:
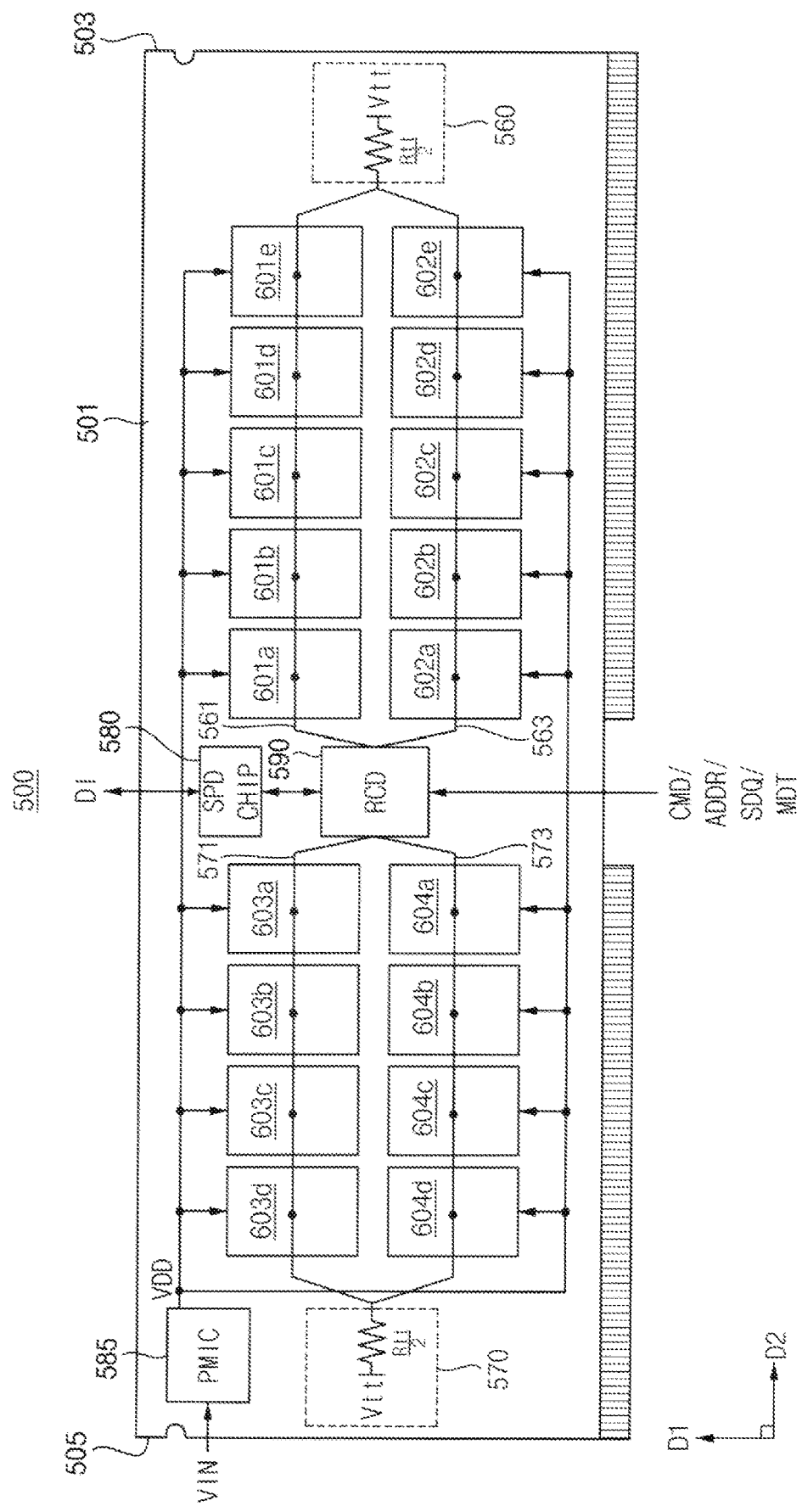
FIG. 24 is a block diagram illustrating an example of a memory module that may be employed to a memory system according to some example embodiments.

FIG. 24 is a block diagram illustrating an example of a memory module that may be employed to a memory system according to example embodiments.

Referring to FIG. 24, a memory module 500 may include a buffer chip 590 (e.g., a registered clock driver; RCD) arranged in or mounted on a circuit board 501, a plurality of memory devices 601a, 601b, 601c, 601d, 601e, 602a, 602a, 602c, 602d, 602e, 603a, 603b, 603c, 603d, 604a, 604b, 604c and 604d, module resistance units 560 and 570, a serial present detection (SPD) chip 580, and/or a power management integrated circuit (PMIC) 585.

The buffer chip 590 may control the semiconductor memory devices 601a to 601e, 602a to 602e, 603a to 603d and 604a to 604d, and the PMIC 585, under a control of the memory controller 100. For example, the buffer chip 590 may receive the address ADDR, the command CMD, the user data set SDQ and the meta data MDT from the memory controller 100.

The SPD chip 580 may be a programmable read only memory (PROM) (e.g., an electrically erasable PROM (EEPROM)). The SPD chip 580 may include initial information and/or device information DI of the memory module 500. In some example embodiments, the SPD chip 580 may include the initial information and/or the device information DI such as a module form, a module configuration, a storage capacity, a module type, an execution environment, and/or the like of the memory module 500.

When a memory system including the memory module 500 is booted up, the memory controller 100 may read the device information DI from the SPD chip 580, and may recognize the memory module 500 based on the device information DI. The memory controller 100 may control the memory module 500 based on the device information DI from the SPD chip 580. For example, the memory controller 100 may recognize a type of the memory devices included in the memory module 500 based on the device information DI from the SPD chip 580.

Here, the circuit board 501, which may be a printed circuit board (PCB), may extend in a second direction D2, perpendicular to a first direction D1, between a first edge portion 503 and a second edge portion 505. The first edge portion 503 and the second edge portion 505 may extend in the first direction D1. The buffer chip 590 may be arranged on a center of the circuit board 501. The plurality of memory devices 601a to 601e, 602a to 602e, 603a to 603d and 604a to 604d may be arranged in a plurality of rows between the buffer chip 590 and the first edge portion 503, and between the buffer chip 590 and the second edge portion 505. In some example embodiments, operations described herein as being performed by the buffer chip 590 may be performed by processing circuitry.

In this example, the memory devices 601a to 601e and 602a to 602e may be arranged in or along a plurality of rows between the buffer chip 590 and the first edge portion 503. The memory devices 603a to 603d and 604a to 604d may be arranged in or along a plurality of rows between the buffer chip 590 and the second edge portion 505. The memory devices 601a to 601d, 602a to 602d, 603a to 603d and 604a to 604d may be referred to as data chips, and the memory devices 601e and 602e may be referred to as parity chips.

The buffer chip 590 may generate first parity data and second parity data based on the user data set SDQ and the meta data MDT, may store the user data set SDQ and the meta data MDT in the data chips, and may store the first parity data and the second parity data in the parity chips.

The buffer chip 590 may provide a command/address signal (e.g., CA) to the memory devices 601a to 601e through a command/address transmission line 561, and may provide a command/address signal to the memory devices 602a to 602e through a command/address transmission line 563. In addition, the buffer chip 590 may provide a command/address signal to the memory devices 603a to 603d through a command/address transmission line 571, and may provide a command/address signal to the memory devices 604a to 604d through a command/address transmission line 573.

The command/address transmission lines 561 and 563 may be connected in common to the module resistance unit 560 that is adjacent to the first edge portion 503, and the command/address transmission lines 571 and 573 may be connected in common to the module resistance unit 570 that is adjacent to the second edge portion 505. Each of the module resistance units 560 and 570 may include a termination resistor Rtt/2 connected to a termination voltage Vtt.

For example, each of or at least one of the plurality of memory devices 601a to 601e, 602a to 602e, 603a to 603d and 604a to 604d may be or include a DRAM device.

The SPD chip 580 may be arranged to be adjacent to the buffer chip 590, and the PMIC 585 may be between the memory device 603d and the second edge portion 505. The PMIC 585 may generate a power supply voltage VDD based on an input voltage VIN, and may provide the power supply voltage VDD to the memory devices 601a to 601e, 602a to 602e, 603a to 603d and 604a to 604d.

Figure 25:
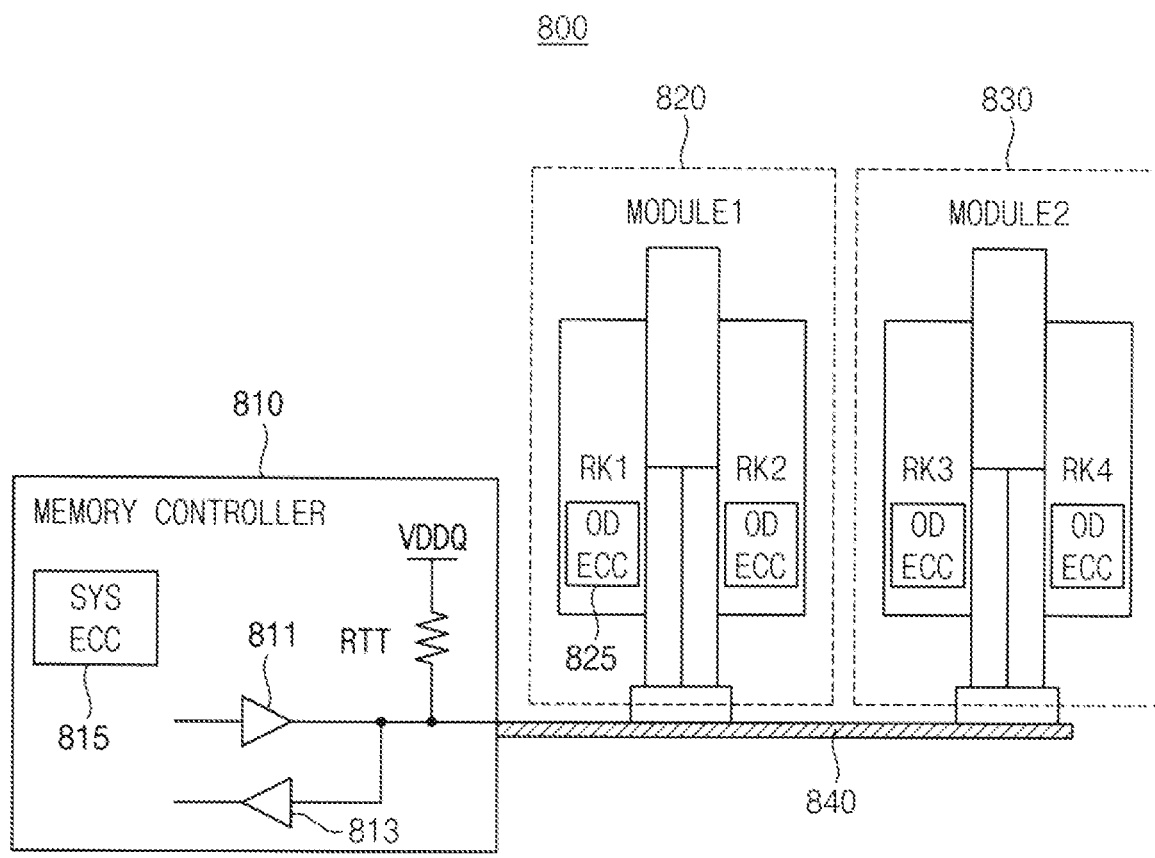
FIG. 25 is a block diagram illustrating an example of a memory system according to some example embodiments.

FIG. 25 is a block diagram illustrating an example of a memory system according to some example embodiments.

Referring to FIG. 25, a memory system 800 may include a memory controller 810 and/or memory modules 820 and 830. For example, the memory system 800 may have quad-rank memory modules. While two memory modules are depicted in FIG. 25, more or fewer memory modules may be included in the memory system 800, according to example embodiments.

The memory controller 810 may control the memory modules 820 and/or 830 so as to perform a command supplied from a processor and/or a host. The memory controller 810 may be implemented using processing circuitry (e.g., a processor) and/or may be implemented with a host, an application processor (AP) or a system-on-a-chip (SoC). For signal integrity, a source termination may be implemented with a resistor RTT on a bus 840 of the memory controller 810. The resistor RTT may be connected to a power supply voltage VDDQ. The memory controller 810 may include a transmitter 811 that may transmit a signal to at least one of the memory modules 820 and/or 830, and a receiver 813 that may receive a signal from at least one of the memory modules 820 and/or 830. The memory controller 810 may include a system ECC engine 815. The system ECC engine 815 may correspond to the system ECC engine 130 in FIG. 2.

As discussed herein, the system ECC engine 815 may select at least one of the plurality of decoding schemes DEC1 to DECX based on the decoding status flag DSF received from the memory modules 820 and/or 830, and may perform the ECC decoding using the selected decoding scheme. Accordingly, the ECC decoding may be performed by selecting the decoding scheme suitable or appropriate for the current situation and/or occurrences of errors in the plurality of memory modules 820 and/or 830.

The memory modules 820 and 830 may be referred to as a first memory module 820 and a second memory module 830. The first memory module 820 and the second memory module 830 may be connected to the memory controller 810 through the bus 840. Each of the first memory module 820 and the second memory module 830 may correspond to the memory module MM in FIG. 2. The first memory module 820 may include memory ranks RK1 and RK2, and the second memory module 830 may include memory ranks RK3 and RK4.

Each of the first memory module 820 and the second memory module 830 may include a plurality of memory chips including a plurality of data chips and at least one parity chip, and each memory chip may include an on-die ECC engine 825 that generates the decoding status flag DSF. The on-die ECC engine 825 may correspond to the on-die ECC engines 400a to 400k and 400p in FIG. 2.

Figure 26:
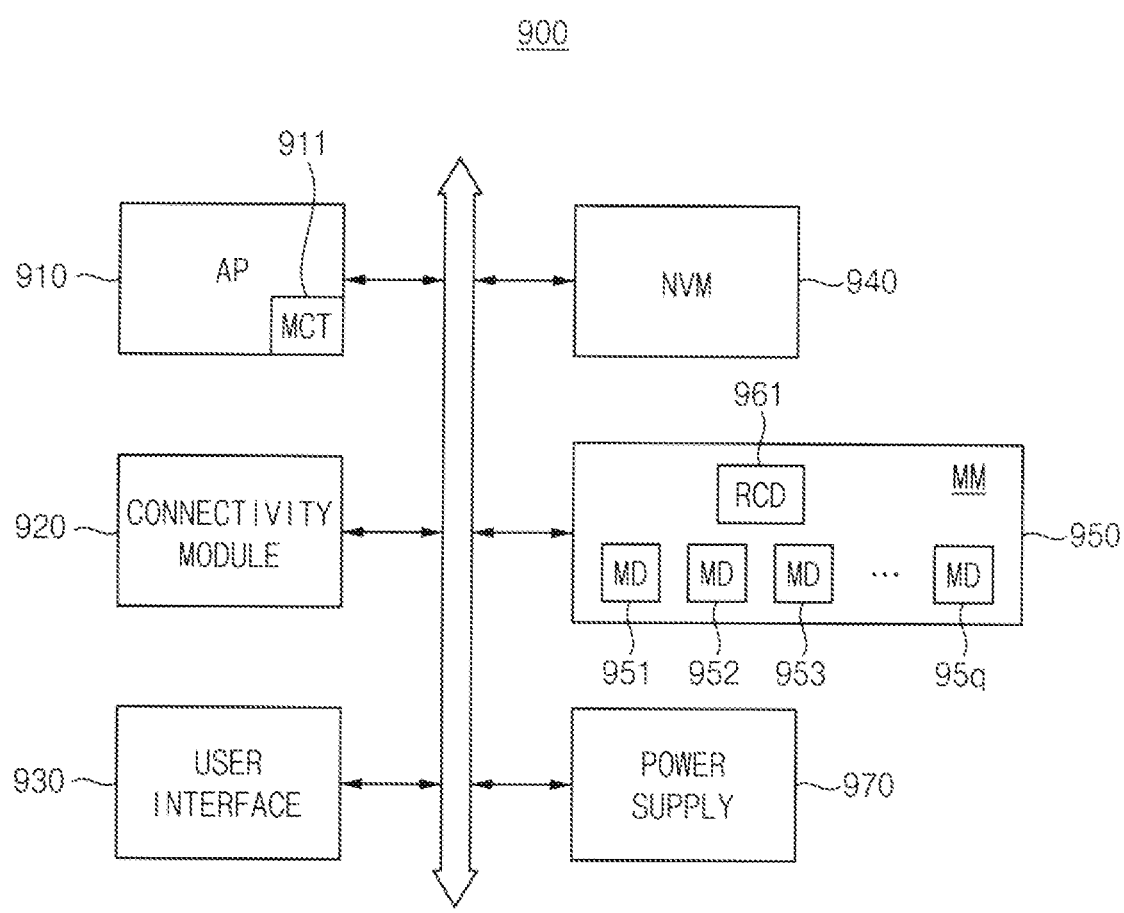
FIG. 26 is a block diagram illustrating an electronic system including a memory module according to some example embodiments.

FIG. 26 is a block diagram illustrating an electronic system including a memory module according to some example embodiments.

Referring to FIG. 26, an electronic system 900 may include an application processor 910, a connectivity module 920, a user interface 930, a nonvolatile memory device (NVM) 940, a memory module (MM) 950 such as a DIMM, and/or a power supply 970. For example, the electronic system 900 may be a mobile system.

The application processor 910 may include a memory controller 911. The memory controller 911 may include a system ECC engine (e.g., the system ECC engine 130 of FIG. 2).

The application processor 910 may execute applications, such as at least one of a web browser, a game application, a video player, etc. The connectivity module 920 may perform wired and/or wireless communication with an external device.

The memory module 950 may store data processed by the application processor 910 and/or operate as a working memory. The memory module 950 may include a plurality of memory devices (MD) 951, 952, 953, . . . , 95*q* (where q is a positive integer greater than three), and/or a buffer chip (RCD) 961. The memory module 950 may be the memory module 500 of FIG. 24.

The plurality of memory devices 951 to 95*q* may include a plurality of memory chips each of which includes an on-die ECC engine (e.g., the on-die ECC engines 400*a* to 400*k* and 400*p* of FIG. 2). Therefore, the memory controller 911 may select at least one of the plurality of decoding schemes DEC1 to DECX based on the decoding status flag DSF received from the memory module 950, and may perform the ECC decoding using the selected decoding scheme. Accordingly, the ECC decoding may be performed by selecting the decoding scheme that is suitable or appropriate for the current situation and/or occurrences of errors in the plurality of memory devices 951 to 95*q*.

The nonvolatile memory device 940 may store a boot image for booting the electronic system 900. The user interface 930 may include at least one input device, such as a keypad, a touch screen, etc., and at least one output device, such as a speaker, a display device, etc. The power supply 970 may supply an operating voltage to the electronic system 900.

The electronic system 900 or components of the electronic system 900 may be mounted using various types of packages.

The inventive concepts may be applied to various electronic devices and systems that include the memory modules and the memory systems. For example, the inventive concepts of the present disclosure may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, or the like.

The foregoing is illustrative of some example embodiments and is not to be construed as limiting thereof or limiting of the inventive concepts. Although some example embodiments have been described, those skilled in the art will readily appreciate that many modifications are possible in the example embodiments without materially departing from the novel teachings and advantages of the example embodiments and of the inventive concepts. Accordingly, all such modifications are intended to be included within the scope of the example embodiments as defined in the appended claims.

What is claimed is:

1. A method of operating a memory controller configured to control a memory module, the memory module including a plurality of data chips and at least one parity chip, each of the data chips and the at least one parity chip including an on-die error correction code (ECC) engine, the method comprising:
   receiving a decoding status flag from the memory module;
   obtaining a first number and a second number based on the decoding status flag, the first number representing a number of first chips including an uncorrectable error that is uncorrectable by the respective on-die ECC engine, the second number representing a number of second chips including a correctable error that is correctable by the respective on-die ECC engine;
   selecting at least one of a plurality of decoding schemes based on at least one of the first number and the second number; and
   performing, by a system ECC engine included in the memory controller, an ECC decoding on at least one of the first chips and the second chips based on the selected decoding scheme.

2. The method of claim 1, wherein selecting the at least one of the plurality of decoding schemes based on the at least one of the first number and the second number includes:
   in response to the first number being less than or equal to a first reference value, selecting the at least one of the plurality of decoding schemes based on the second number; and
   in response to the first number being greater than the first reference value, selecting the at least one of the plurality of decoding schemes based on the first number.

3. The method of claim 2, wherein the first reference value is zero.

4. The method of claim 2, wherein the first number is less than or equal to the first reference value, wherein selecting the at least one of the plurality of decoding schemes based on the second number includes selecting a first decoding scheme, and wherein performing the ECC decoding on at least one of the first chips and the second chips based on the selected decoding scheme includes performing the first decoding scheme on the second chips.

5. The method of claim 4, wherein the selected first decoding scheme is a Chipkill decoding scheme.

6. The method of claim 4, wherein selecting the at least one of the plurality of decoding schemes based on the second number further includes:
   in response to the second number being greater than a second reference value and less than or equal to a third reference value, additionally selecting another decoding scheme after the first decoding scheme is selected.

7. The method of claim 6, wherein performing the ECC decoding on the at least one of the first chips and the second chips includes:
   in response to the second number being greater than the second reference value and less than or equal to the third reference value, additionally performing the ECC decoding on the second chips based on the other decoding scheme after the ECC decoding is performed on the second chips based on the first decoding scheme.

8. The method of claim 2, wherein the first number is greater than the first reference value, and selecting the at least one of the plurality of decoding schemes based on the first number includes:
   in response to the first number being greater than the first reference value and less than or equal to a fourth reference value, selecting a second decoding scheme different from a first decoding scheme;
   in response to the first number being greater than the fourth reference value and less than or equal to a fifth reference value, selecting a third decoding scheme different from the first and second decoding schemes; and
   in response to the first number being greater than the fifth reference value, determining that the ECC decoding by the system ECC engine is not possible.

9. The method of claim 8, wherein performing the ECC decoding on the at least one of the first chips and the second chips includes:
   in response to the first number being greater than the first reference value and less than or equal to the fourth reference value, performing the ECC decoding on the first chips based on the second decoding scheme; and in response to the first number being greater than the fourth reference value and less than or equal to the fifth reference value, performing the ECC decoding on the first chips based on the third decoding scheme.

10. The method of claim 9, wherein the second decoding scheme and the third decoding scheme are erasure decoding schemes.

11. The method of claim 2, wherein the first number is less than or equal to the first reference value, and selecting the at least one of the plurality of decoding schemes based on the second number includes selecting a half-Chipkill decoding scheme.

12. The method of claim 11, wherein selecting the at least one of the plurality of decoding schemes based on the second number further includes:

in response to the second number being greater than a sixth reference value and less than or equal to a seventh reference value, additionally selecting a second decoding scheme different from the half-Chipkill decoding scheme after the half-Chipkill decoding scheme is selected.

13. The method of claim 2, wherein the first number is greater than the first reference value, and selecting the at least one of the plurality of decoding schemes based on the first number includes:

in response to the first number being less than or equal to an eighth reference value, selecting a half-Chipkill decoding scheme; and in response to the first number being greater than the eighth reference value, determining that the ECC decoding by the system ECC engine is not possible.

14. The method of claim 13, wherein selecting the at least one of the plurality of decoding schemes based on the first number further includes:

in response to the first number being less than or equal to the eighth reference value, additionally selecting a second decoding scheme different from the first decoding scheme after the first decoding scheme is selected.

15. The method of claim 14, wherein the second decoding scheme is an erasure decoding scheme.

16. A memory controller configured to control a memory module, the memory module comprising a plurality of data chips and at least one parity chip, each of the plurality of data chips and the at least one parity chip including an on-die error correction code (ECC) engine, the memory controller comprising:

a decoding status flag decoder configured to receive a decoding status flag from the memory module, and to obtain a first number and a second number based on the decoding status flag, the first number representing a number of first chips including an uncorrectable error that is uncorrectable by the on-die ECC engine, the second number representing a number of second chips including a correctable error that is correctable by the on-die ECC engine; and a system ECC engine configured to select at least one of a plurality of decoding schemes based on at least one of the first number and the second number, and to perform an ECC decoding on at least one of the first chips and the second chips based on the selected decoding scheme.

17. The memory controller of claim 16, wherein:

the plurality of data chips include first to N-th data chips configured to store main data, where N is a natural number equal to or greater than two, and the at least one parity chip includes a first parity chip configured to store error locator parity data, and a second parity chip configured to store error magnitude parity data.

18. The memory controller of claim 17, wherein the plurality of decoding schemes include a first decoding scheme that is performed on one data chip, a second decoding scheme that is performed on one data chip and is different from the first decoding scheme, and a third decoding scheme that is performed on two data chips and is different from the first and second decoding schemes.

19. The memory controller of claim 16, wherein:

the plurality of data chips include first to M-th data chips configured to store main data, where M is a natural number equal to or greater than two, and the at least one parity chip includes a first parity chip configured to store error locator parity data and error magnitude parity data.

20. A memory system comprising:

a memory module including a plurality of data chips and at least one parity chip, each of the plurality of data chips and the at least one parity chip including an on-die error correction code (ECC) engine; and a memory controller configured to control the memory module, wherein the memory controller includes:

a decoding status flag decoder configured to receive a decoding status flag from the memory module, and to obtain a first number and a second number based on the decoding status flag, the decoding status flag being generated by the on-die ECC engine, the first number representing a number of first chips that include an uncorrectable error that is uncorrectable by the on-die ECC engine, the second number representing a number of second chips that include a correctable error that is correctable by the on-die ECC engine; and a system ECC engine configured to select at least one of a plurality of decoding schemes based on at least one of the first number and the second number, and to perform an ECC decoding on at least one of the first chips and the second chips based on the selected decoding scheme, and wherein the system ECC engine is configured to select the at least one of the plurality of decoding schemes based on the second number in response to the first number being less than or equal to a first reference value, and to select the at least one of the plurality of decoding schemes based on the first number in response to the first number being greater than the first reference value, and wherein each the on-die ECC engine includes:

a syndrome generation circuit configured to generate a syndrome based on read data and parity data;

an error locator configured to generate an error position signal by decoding the syndrome, the error position signal representing a position of an error bit in the read data;

a data corrector configured to output corrected data by correcting the error bit included in the read data based on the error position signal; and a decoding status flag generator configured to generate the decoding status flag based on the syndrome and the error position signal, the decoding status flag representing a state of the error bit in the read data.

* * * * *